(12) United States Patent
Ripley et al.

(10) Patent No.: US 9,428,232 B2
(45) Date of Patent: Aug. 30, 2016

(54) SNOWMOBILE

(71) Applicant: Polaris Industries Inc., Medina, MN (US)

(72) Inventors: Anthony J. Ripley, Ham Lake, MN (US); Luc C. Wilson, Roseau, MN (US); Martin E. Sampson, Roseau, MN (US); Jeffrey A. Eaton, Roseau, MN (US); Lyle J. Dahlgren, Roseau, MN (US); Matthew M. Sweere, New York Mills, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/338,871

(22) Filed: Jul. 23, 2014

(65) Prior Publication Data
US 2016/0023716 A1    Jan. 28, 2016

(51) Int. Cl.
| | | |
|---|---|---|
| *B62M 27/02* | (2006.01) | |
| *B62D 55/30* | (2006.01) | |
| *B62D 55/104* | (2006.01) | |
| *B60G 7/00* | (2006.01) | |
| *B60K 15/063* | (2006.01) | |
| *B62D 1/16* | (2006.01) | |

(52) U.S. Cl.
CPC .............. *B62D 55/30* (2013.01); *B60G 7/001* (2013.01); *B60K 15/063* (2013.01); *B62D 1/16* (2013.01); *B62D 55/104* (2013.01); *B62M 27/02* (2013.01); *B62M 2027/026* (2013.01); *B62M 2027/027* (2013.01); *B62M 2027/028* (2013.01)

(58) Field of Classification Search
CPC .......... B62M 27/02; B62M 2027/026; B62M 2027/028; B60G 2206/016
USPC .......... 180/190; 74/551.1, 488, 551.8, 551.9
See application file for complete search history.

(56) References Cited

U.S. PATENT DOCUMENTS

| | | | | |
|---|---|---|---|---|
| 3,840,082 | A * | 10/1974 | Olson | 180/9.5 |
| 4,337,962 | A * | 7/1982 | Allen et al. | 280/279 |
| 5,033,325 | A * | 7/1991 | Giard, Jr. | 74/551.3 |
| 5,064,157 | A * | 11/1991 | O'Neal | 248/230.1 |
| 5,197,755 | A * | 3/1993 | Quick | 280/124.141 |
| 5,226,341 | A * | 7/1993 | Shores | 74/551.8 |
| 6,298,962 | B1 * | 10/2001 | Kato et al. | 188/371 |
| 6,328,124 | B1 * | 12/2001 | Olson et al. | 180/182 |
| 6,357,543 | B1 * | 3/2002 | Karpik | 180/182 |
| 6,363,812 | B1 * | 4/2002 | Yamamura | 74/551.8 |
| 6,655,487 | B2 * | 12/2003 | Mallette et al. | 180/190 |
| 6,767,022 | B1 * | 7/2004 | Chevalier | 280/124.136 |
| 6,904,990 | B2 * | 6/2005 | Etou | 180/190 |

(Continued)

FOREIGN PATENT DOCUMENTS

DE         19542496 C1 * 10/1996

*Primary Examiner* — Joseph Rocca
*Assistant Examiner* — Michael Stabley
(74) *Attorney, Agent, or Firm* — Faegre Baker Daniels LLP

(57) ABSTRACT

A snowmobile includes a plurality of ground engaging members, a frame supported by the ground engaging members, and a powertrain assembly supported by the frame. Additionally, the snowmobile includes a front suspension assembly supported by the frame. The front suspension assembly includes an upper control arm operably coupled to the frame and a lower control arm operably coupled to the frame. The lower control arm is forged. At least a portion of the lower control arm includes an artificially-induced area of localized stress, and the lower control arm is configured to absorb energy at the area of localized stress.

26 Claims, 35 Drawing Sheets

(56) References Cited

U.S. PATENT DOCUMENTS

| | | | |
|---|---|---|---|
| 6,942,050 B1* | 9/2005 | Honkala et al. | 180/182 |
| 7,143,662 B2* | 12/2006 | Hobson, Jr. | 74/551.3 |
| 7,410,182 B1* | 8/2008 | Giese et al. | 280/124.135 |
| 7,422,083 B2* | 9/2008 | Yoshihara et al. | 180/182 |
| 7,665,751 B2* | 2/2010 | Kunert et al. | 280/124.134 |
| 7,753,154 B2* | 7/2010 | Maltais | 180/190 |
| 8,037,961 B2* | 10/2011 | Fecteau | 180/190 |
| 8,225,896 B2* | 7/2012 | Eichenberger et al. | 180/190 |
| 8,302,721 B2* | 11/2012 | Yoshihara et al. | 180/182 |
| 8,695,744 B1* | 4/2014 | Bedard et al. | 180/190 |
| 2006/0032686 A1* | 2/2006 | Berg | 180/190 |
| 2006/0191728 A1* | 8/2006 | Aoshima | 180/190 |
| 2011/0132679 A1* | 6/2011 | Kerner et al. | 180/190 |
| 2014/0232081 A1* | 8/2014 | Gleason et al. | 280/124.125 |

* cited by examiner

SNOWMOBILE

CROSS-REFERENCE TO RELATED APPLICATIONS

The present application is related to U.S. patent application Ser. No. 13/763,282, filed on Feb. 8, 2013; U.S. patent application Ser. No. 14/151,983, filed on Jan. 10, 2014; U.S. patent application Ser. No. 14/152,596, filed on Jan. 10, 2014; U.S. patent application Ser. No. 13/563,962, filed on Aug. 1, 2012; U.S. Provisional Patent Application Ser. No. 61/513,949, filed on Aug. 1, 2011; and U.S. Provisional Patent Application Ser. No. 61/582,426, filed on Jan. 2, 2012, the complete disclosures of which are expressly incorporated by reference herein.

BACKGROUND

The present application relates to a snowmobile, and more particularly, to a lightweight snowmobile for mountains and trails.

Performance characteristics of snowmobiles depend on several parameters of the vehicle, such as width, snow clearance, suspension performance, and weight. It is known that snowmobiles travel through a variety of conditions, including deep snow, light powder, trails, and mountains. Over some terrain, the rider leans on the snowmobile for proper riding in various conditions. Various parameters of the snowmobile affect the ability of the snowmobile to lean and the comfort of the rider when doing so.

SUMMARY

In one embodiment, a snowmobile comprises a plurality of ground engaging members, a frame supported by the ground engaging members, and a powertrain assembly supported by the frame. Additionally, the snowmobile comprises a front suspension assembly supported by the frame. The front suspension assembly includes an upper control arm operably coupled to the frame and a lower control arm operably coupled to the frame. The lower control arm is forged. At least a portion of the lower control arm includes an artificially-induced area of localized stress, and the lower control arm is configured to yield at the area of localized stress.

In a further embodiment, a snowmobile comprises a plurality of ground engaging members and a steering assembly operably coupled to the ground engaging members. The steering assembly includes a steering post, steering arms, and handlebars. Additionally, the snowmobile comprises a frame supported by the ground engaging members. The frame includes a plurality of frame members and a coupling member having an upper portion and a lower portion. The lower portion is separate and spaced apart from the upper portion. The upper and lower portions are configured to couple with the plurality of frame members and the steering post.

Figure 1:
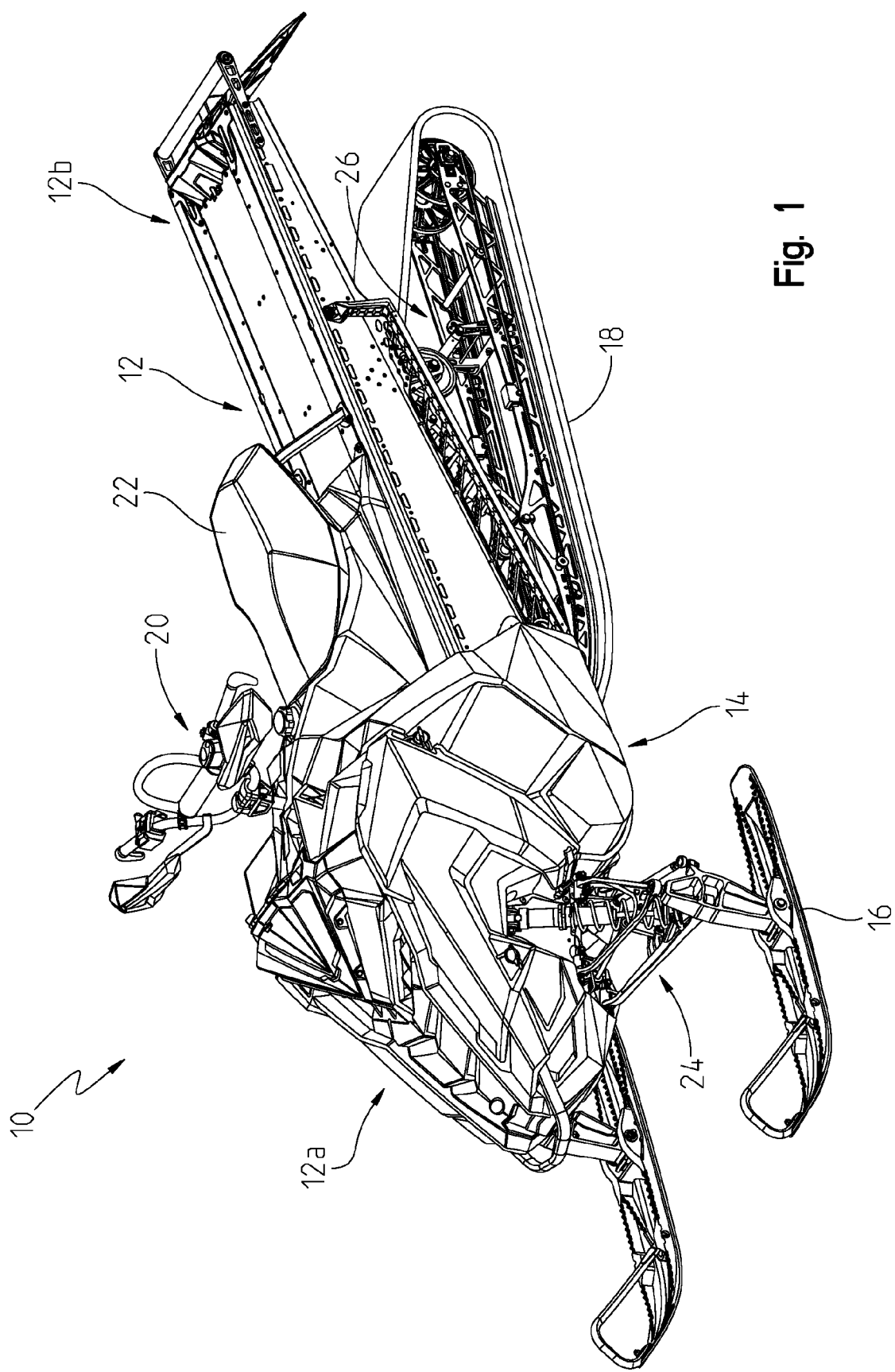
FIG. 1 is a left front perspective view of a snowmobile of the present embodiment.
Figure 2:
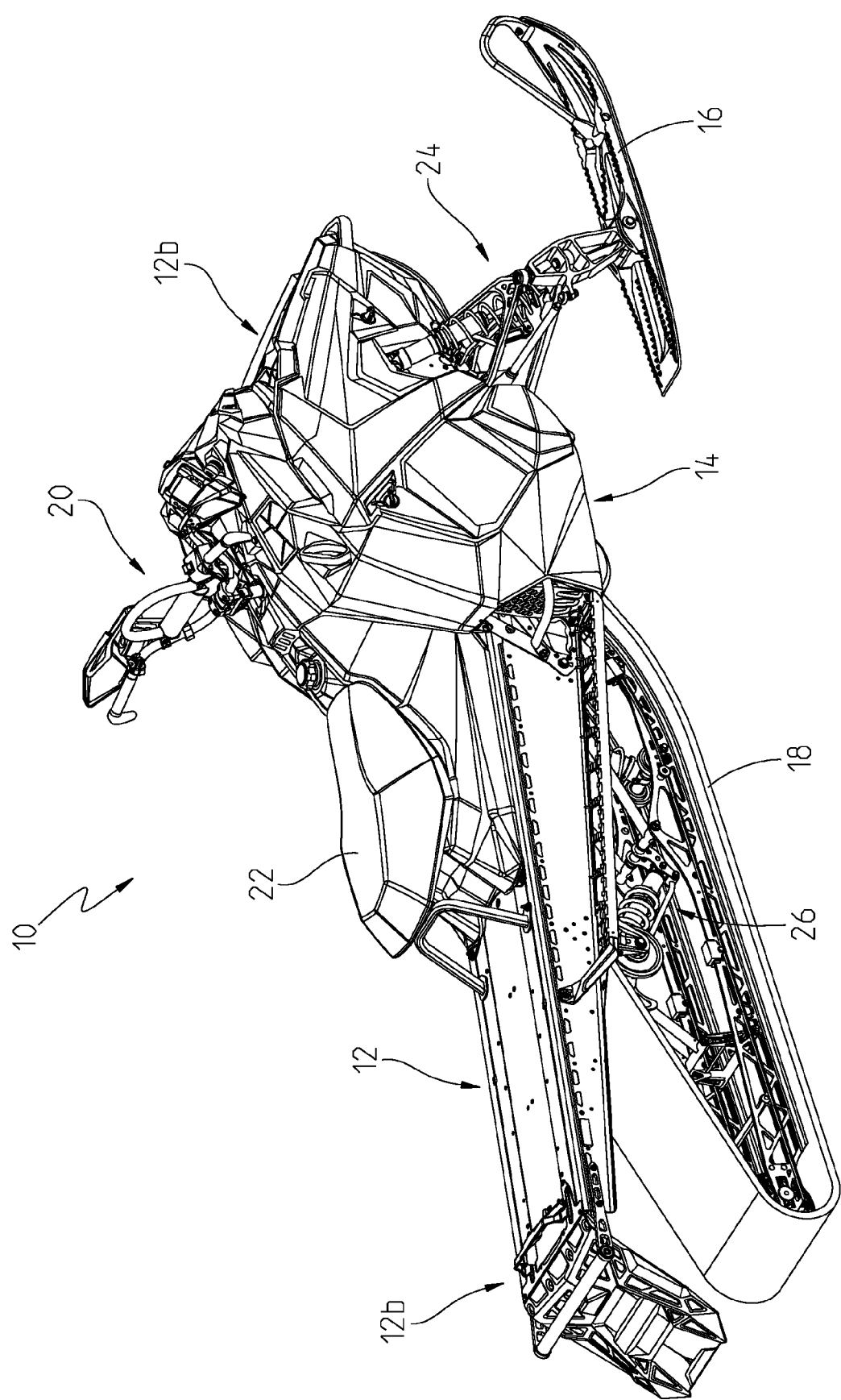
FIG. 2 is a right rear view of the snowmobile of FIG. 1.
Figure 3:
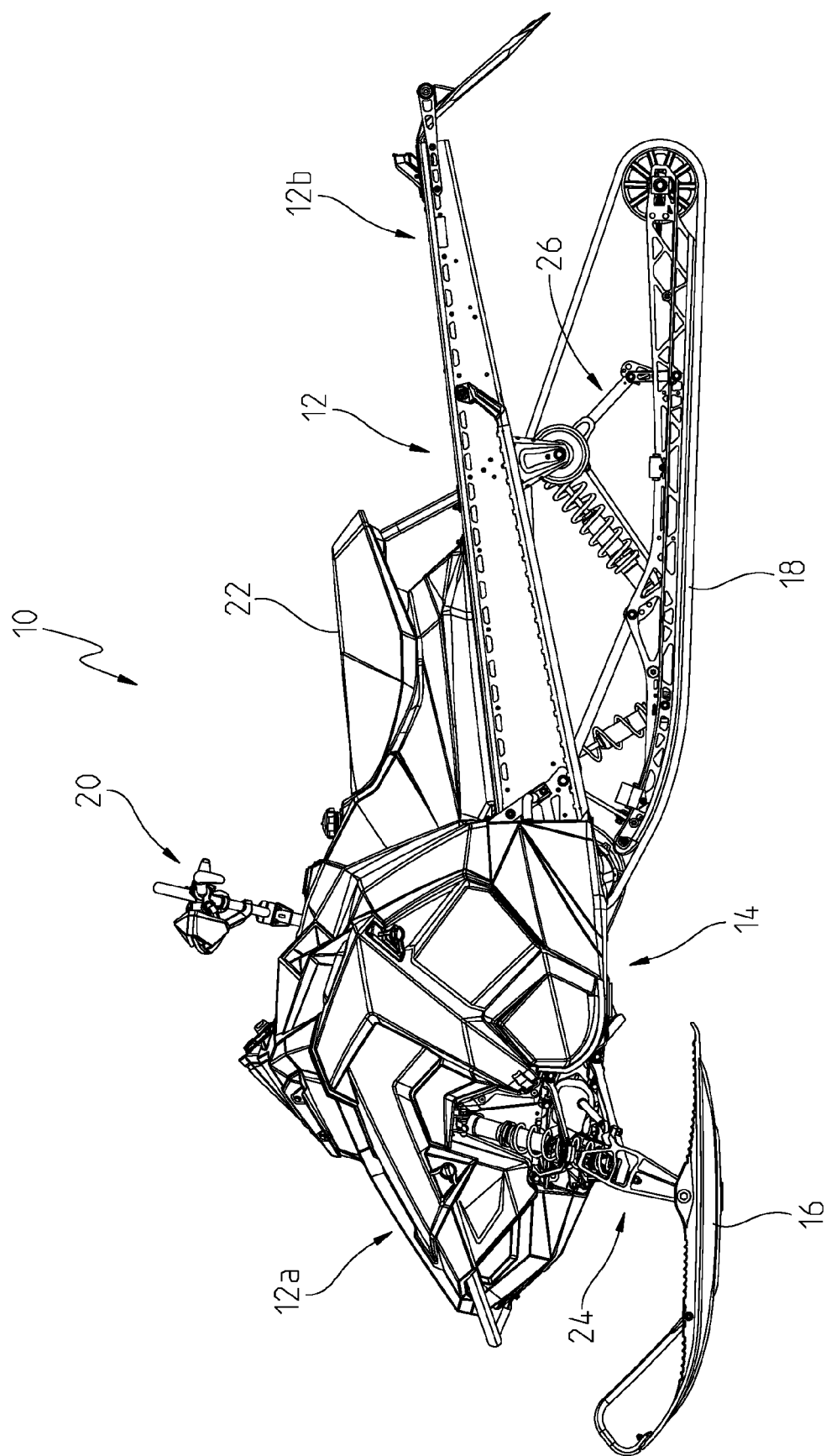
FIG. 3 is a left side view of the snowmobile of FIG. 1.
Figure 4:
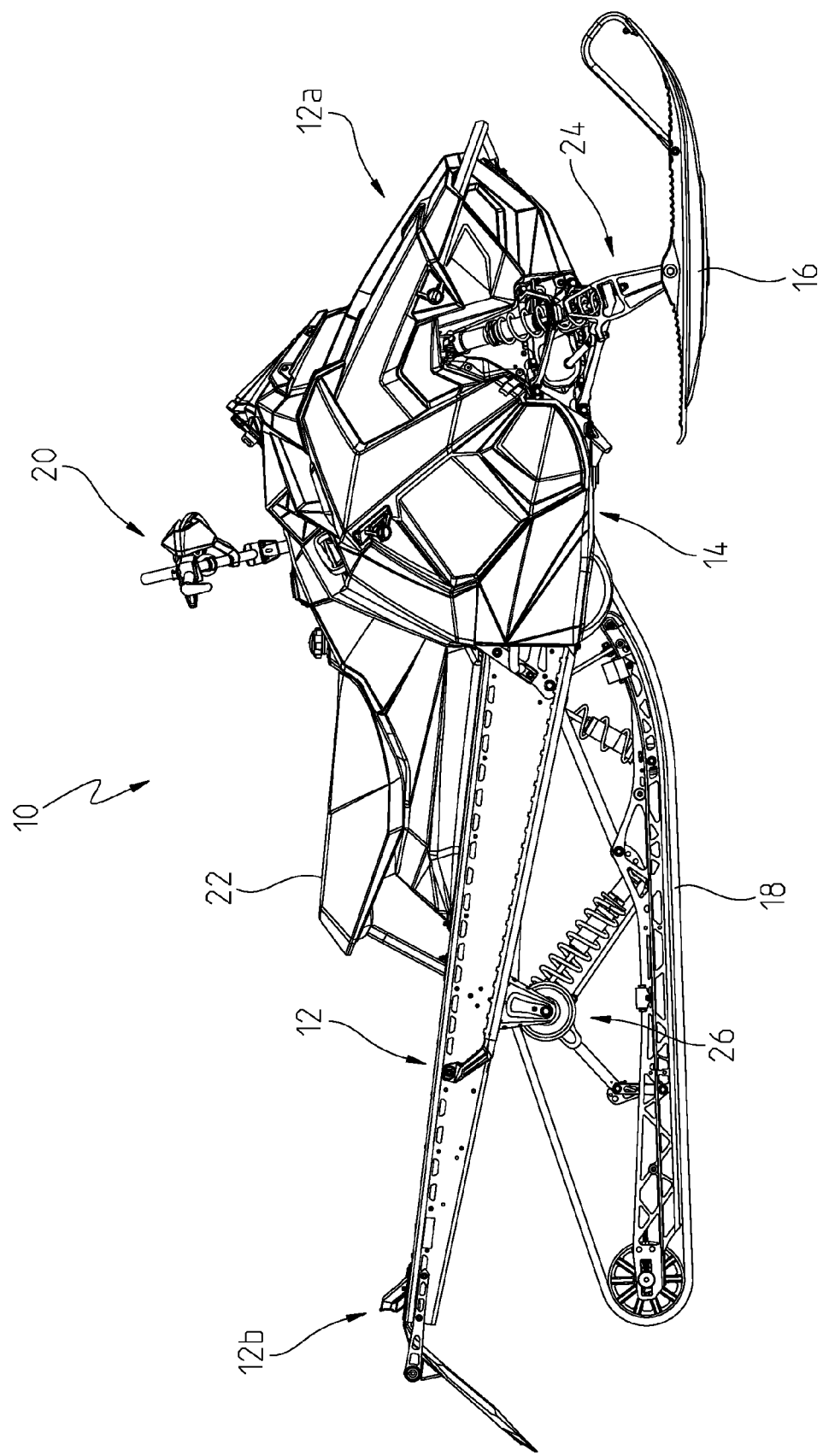
FIG. 4 is a right side view of the snowmobile of FIG. 1.
Figure 5:
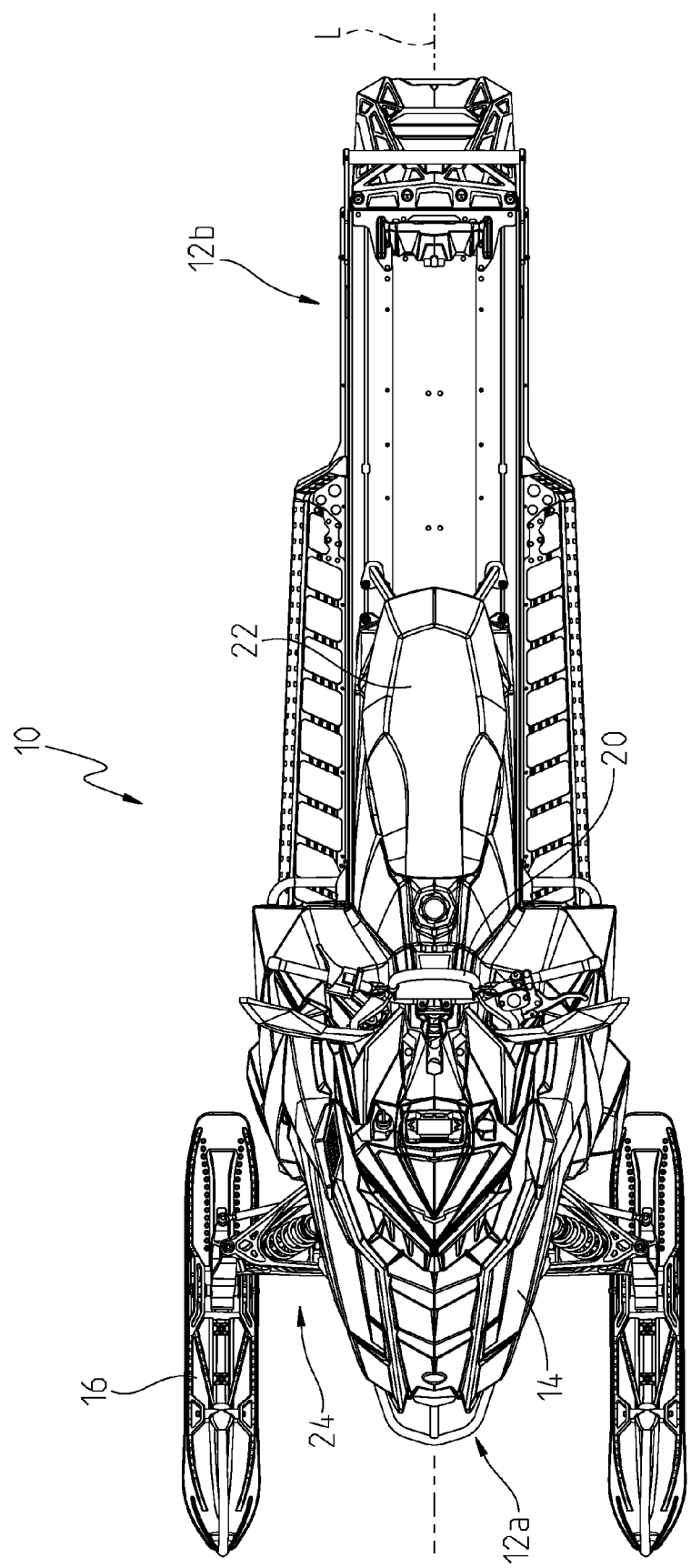
FIG. 5 is a top view of the snowmobile of FIG. 1.
Figure 7:
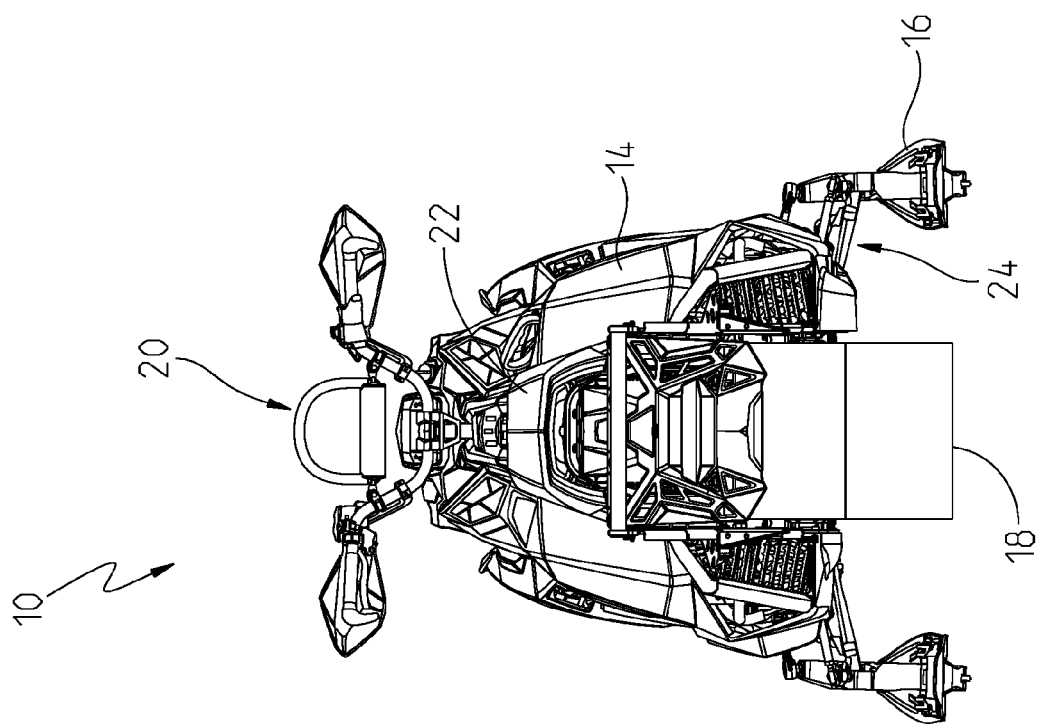
FIG. 7 is a rear view of the snowmobile of FIG. 1.
Figure 6:
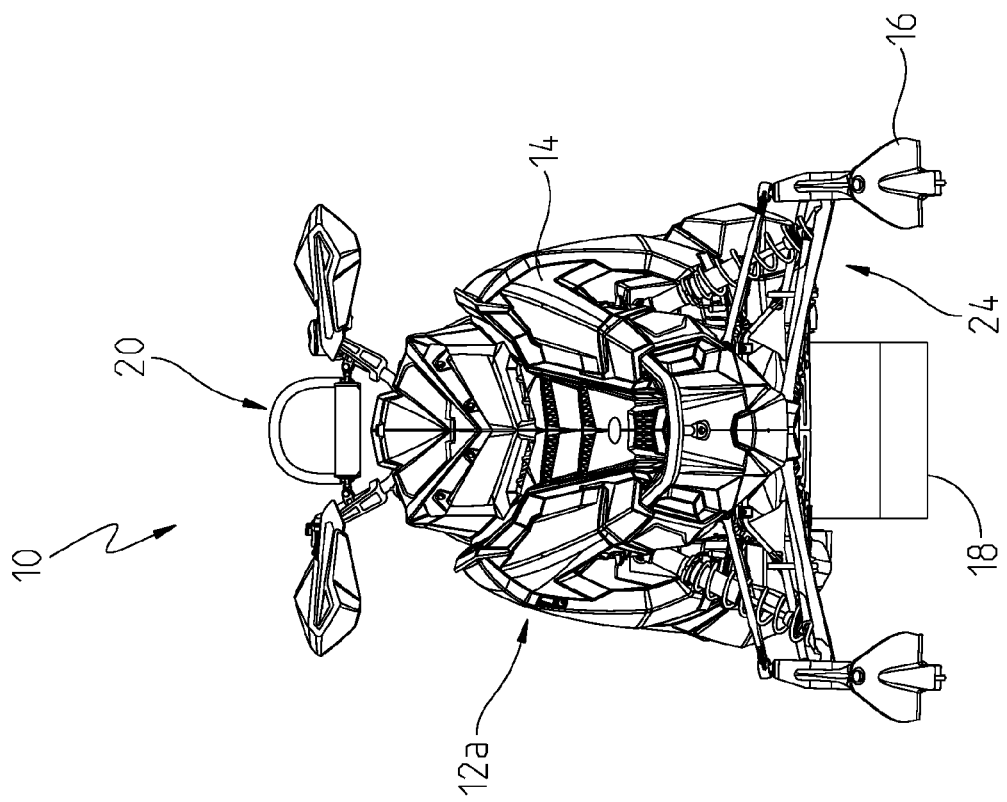
FIG. 6 is a front view of the snowmobile of FIG. 1.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Referring to FIGS. 1-7, an illustrative embodiment of a snowmobile 10 with a longitudinal axis L includes a chassis or frame 12 having a front frame portion 12a and a rear frame portion 12b. A body assembly 14 generally surrounds at least front frame portion 12a of frame 12. Front frame portion 12a is supported by front ground-engaging members, illustratively skis 16, and rear frame portion 12b is supported by a rear ground-engaging member, illustratively an endless track 18. The rider uses a steering assembly 20, which is operably coupled to at least skis 16, when operating snowmobile 10. A seat assembly 22 is provided generally rearward of steering assembly 20 and is configured to support the rider.

Figure 28:
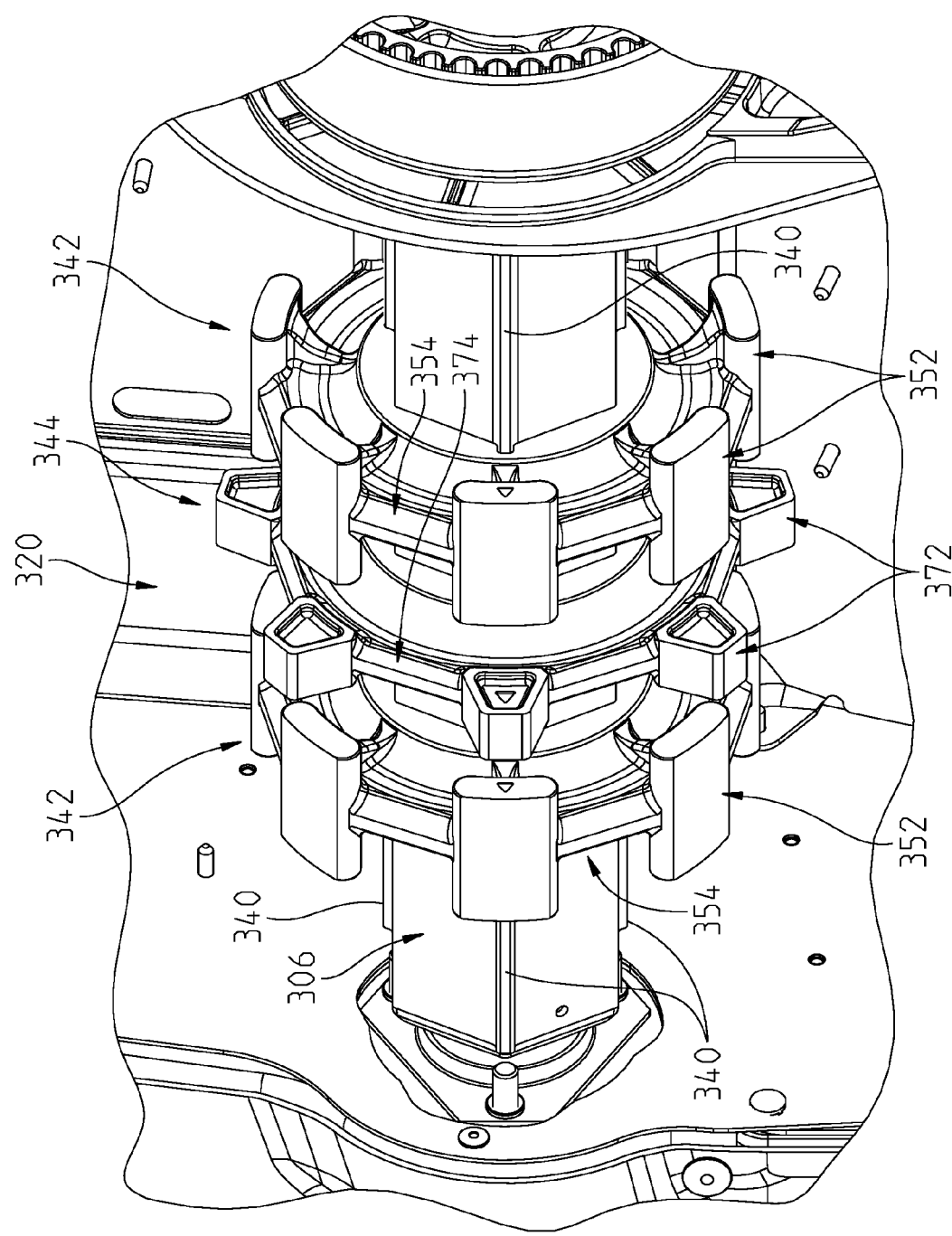
FIG. 28 illustrates a drive shaft and drive sprocket assembly of an illustrated embodiment of the present disclosure.
Figure 29:
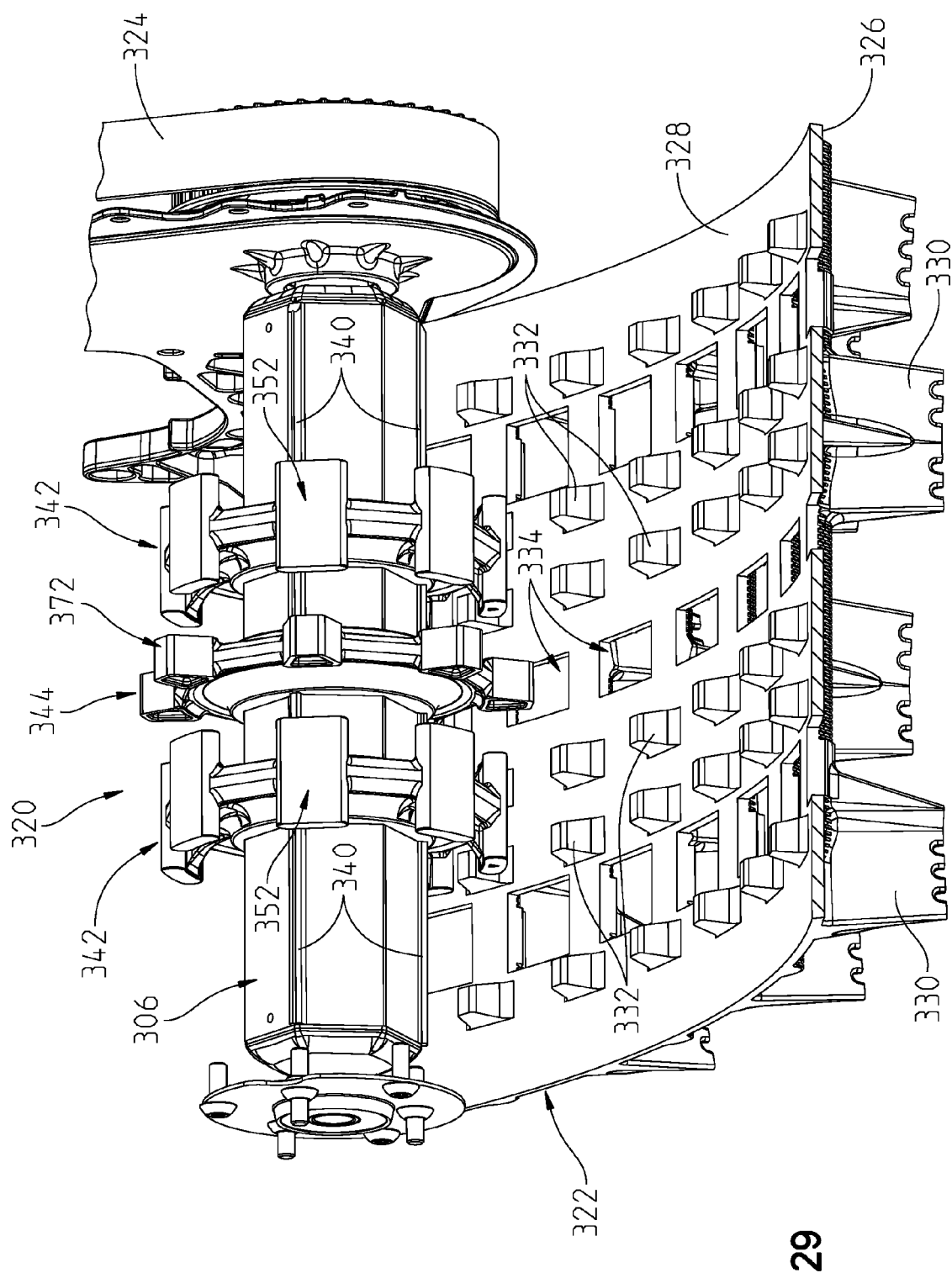
FIG. 29 illustrates the drive shaft and drive sprocket assembly of FIG. 28 driving a track of a snowmobile.

Front skis 16 are operably coupled to a front suspension assembly 24, and endless track 18 cooperates with a rear suspension assembly 26. A powertrain assembly is positioned generally intermediate front suspension assembly 24 and rear suspension assembly 26, and provides power to endless track 18 to move snowmobile 10. More particularly, the powertrain assembly 30 includes an engine, a transmission, and a drive shaft 306 (FIG. 28). In one embodiment, the transmission is a continuously variable transmission ("CVT"). Additional details of frame 12, body assembly 14, endless track 18, front suspension assembly 24, rear suspension assembly 26, and the powertrain assembly are disclosed in U.S. patent application Ser. No. 13/763,282, filed on Feb. 8, 2013, U.S. patent application Ser. No. 14/151,983, filed on Jan. 10, 2014, U.S. patent application Ser. No. 14/152,596, filed on Jan. 10, 2014, U.S. Provisional patent application Ser. No. 61/513,949, filed on Aug. 1, 2011, and U.S. Provisional Patent Application Ser. No. 61/582,426, filed on Jan. 2, 2012, the complete disclosures of which are expressly incorporated by reference herein.

Figure 8:
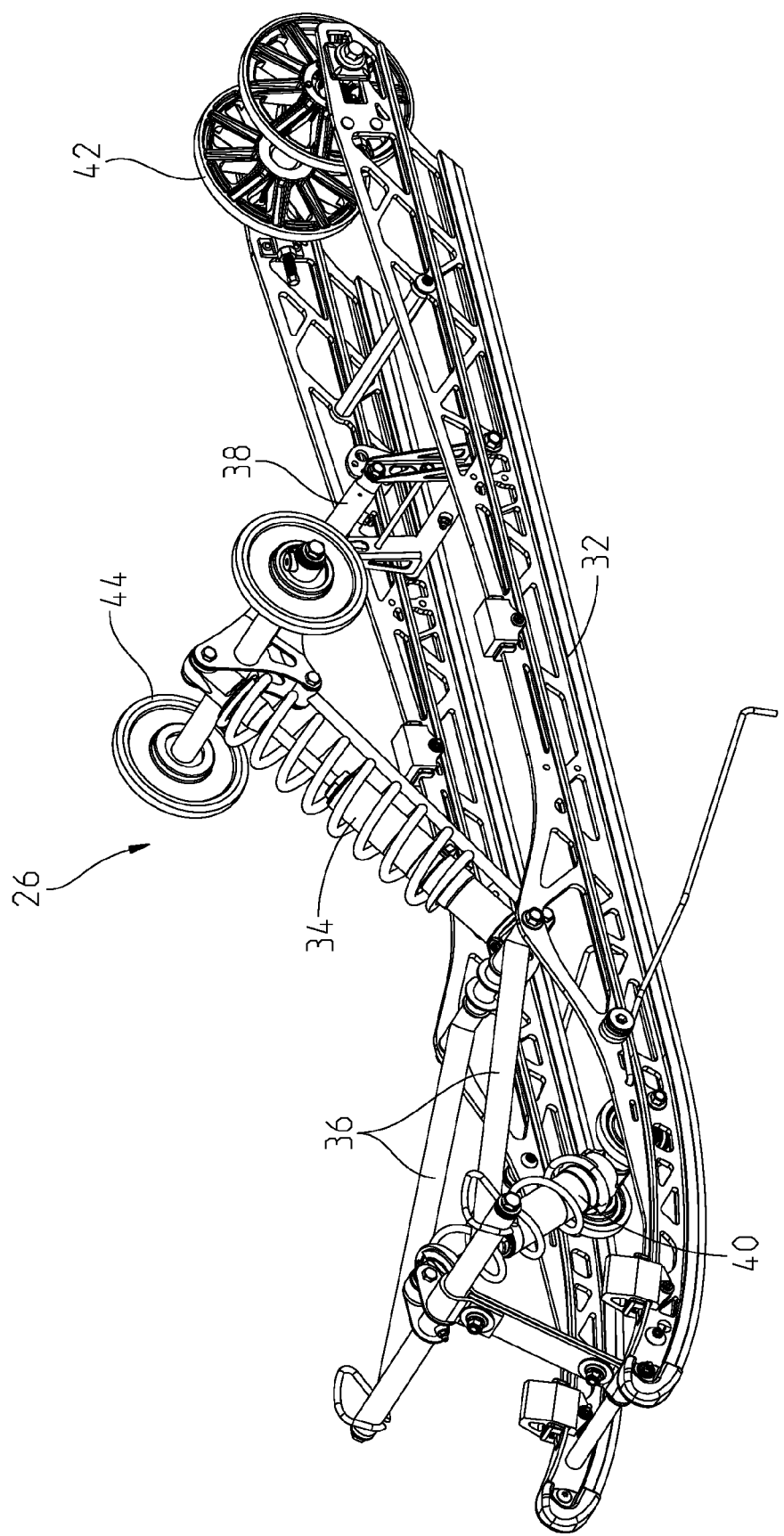
FIG. 8 is a left front perspective view of a rear suspension assembly of the snowmobile of FIG. 1.

As shown in FIG. 8, rear suspension assembly 26 is supported by frame 12 and includes a plurality of slide rails 32, a first linear force element ("LFE") 34, illustratively a shock absorber, a plurality of torque arms 36 operably coupled to a forward, lower end of first LFE 34, and a link assembly 38 operably coupled to a rear, upper end of first LFE 34. In one embodiment, torque arms 36 may be comprised of forged aluminum, which may reduce the overall weight of snowmobile 10. Additionally, rear suspension assembly 26 may include a second LFE 40 positioned forward of first LFE 34 and operably coupled to torque arms 36 and slide rails 32.

Rear suspension assembly 26 also includes a plurality of rear idler wheels 42 rotatably coupled to the rear end of slide rails 32 and a plurality of carrier wheels 44 laterally adjacent the rear, upper end of first LFE 34. Rear idler wheels 42 and carrier wheels 44 are configured to maintain tension in endless track 18. Additionally, the position of rear idler wheels 42 on slide rails 32 may be adjusted to adjust the tension in endless track 18. As shown in FIGS. 1-4, endless track 18 generally surrounds rear suspension assembly 26 and is supported on at least slide rails 32, rear idler wheels 42, and carrier wheels 44. Rear suspension assembly 26 is configured to cooperate with endless track 18 when snowmobile 10 is operating. In particular, rear suspension assembly 26 is configured to move longitudinally and vertically during operation of snowmobile 10, and the tension in endless track 18 is maintained throughout the movement of rear suspension assembly 26 by at least rear idler wheels 42.

Figure 9:
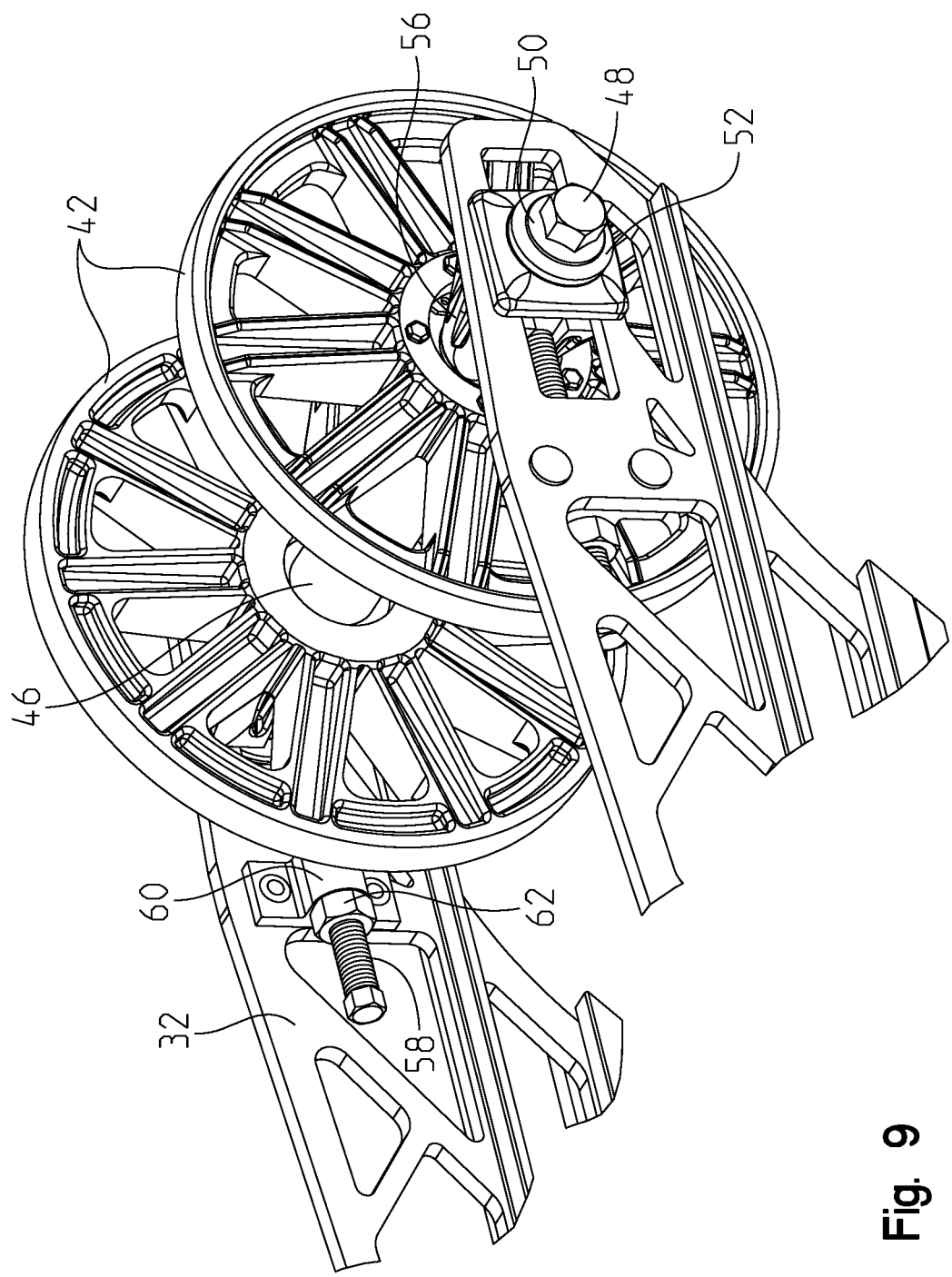
FIG. 9 is a detailed left front perspective view of rear idler wheels of the rear suspension assembly of FIG. 8.
Figure 10:
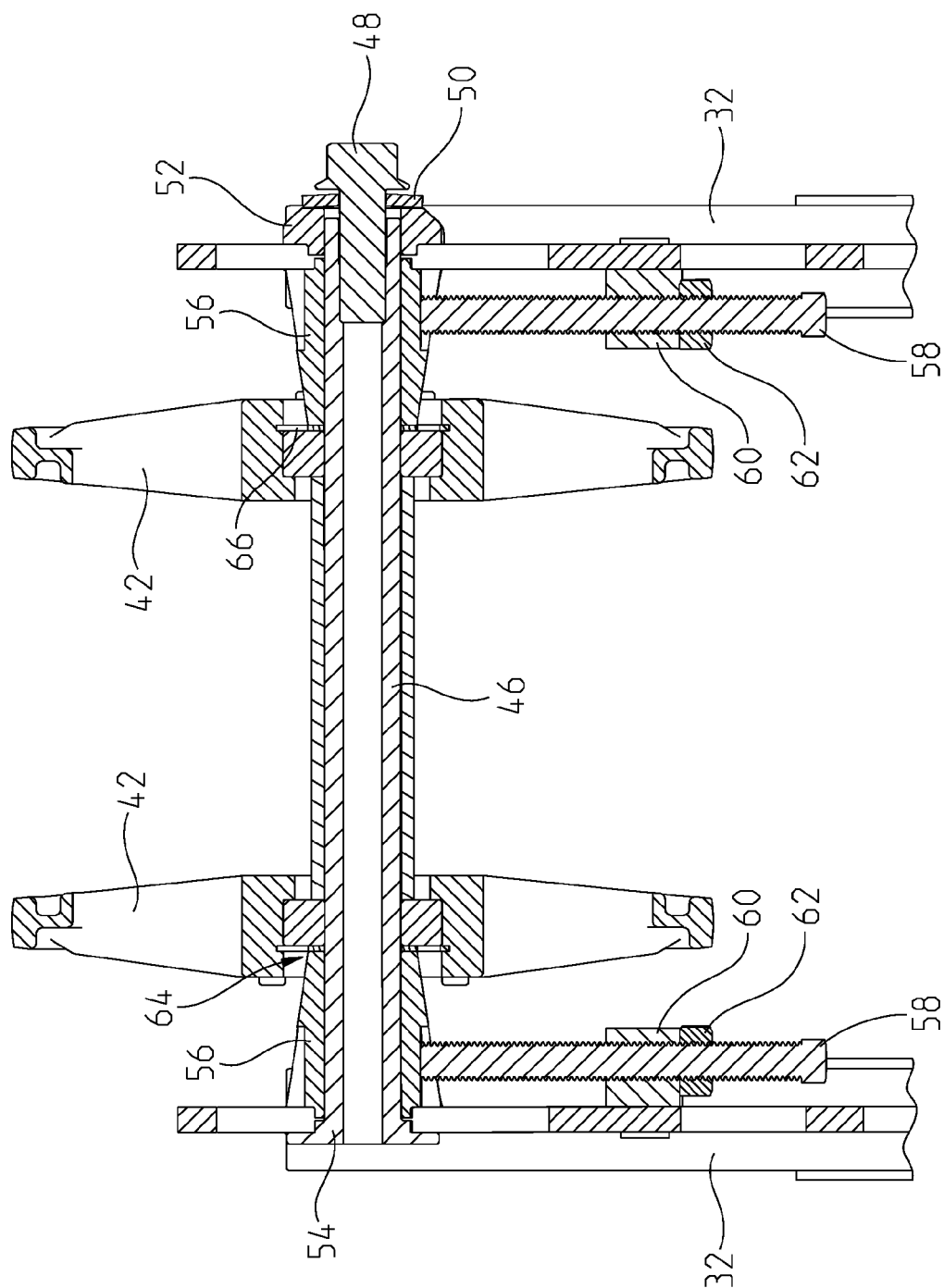
FIG. 10 is a cross-sectional view of the rear idler wheels of FIG. 9.

Referring to FIGS. 8-10, rear idler wheels 42 are operably coupled to slide rails 32 with a rear shaft or axle 46, which extends laterally between rear idler wheels 42 and slide rails 32 in a direction perpendicular to longitudinal axis L. Rear shaft 46 defines the axis of rotation for rear idler wheels 42. Rear shaft 46 is coupled to slide rails 32 with a single fastener, illustratively a single bolt 48. As shown in FIGS. 9 and 10, rear shaft 46 is generally hollow and bolt 48 extends into only one end of rear shaft 46. Additionally, an end cap or bracket 52 and a washer 50 may be coupled to bolt 48 when retaining rear shaft 46 on slide rails 32. The opposing end of rear shaft 46 may include a flange 54 which is configured to be positioned along an outer side of one of slide rails 32 for further retaining rear shaft 46 on slide rails 32. Flange 54 may be integrally coupled to or otherwise formed with rear shaft 46. Illustratively, flange 54 is a positive retention member configured to positively retain rear shaft 46 on slide rails 32. Because rear shaft 46 is generally hollow and only one bolt 48 is necessary for coupling rear shaft 46 to slide rails 32, the weight of snowmobile 10 may be reduced.

Other embodiments of a rear suspension assembly may include two bolts for a rear shaft—one fastener for each rear idler wheel on the rear shaft—which requires loosening or removing both bolts in order to service the components of the rear suspension and/or adjust the tension of the track. However, with both bolts loosened or removed, the rear shaft may spin, thereby making it more difficult to adjust the tension in an endless track. Yet, in the embodiment of FIGS. 8-10, with only one bolt 48, it may be easier to adjust the tension in endless track 18 because only the one bolt 48 is loosened or removed and flange 54 positively retains rear shaft 46 on slide rails 32.

Additionally, a plurality of isolators 56 are integrally coupled to rear shaft 46 and are adjacent the inner sides of slide rails 32. Isolators 56 extend from the inner sides of slide rails 32 into a recess 64 of rear idler wheels 42. Within recess 64 of rear idler wheels 42, isolators 56 contact a washer 66.

As shown in FIG. 10, isolators 56 are engaged with couplers 58 to maintain the position of isolators 56. Illustratively, couplers 58 are threaded bolts. As shown in FIG. 10, couplers 58 extend parallel to longitudinal axis L and contact a forward surface isolators 56. Couplers 58 are supported by brackets 60, which are coupled to slide rails 32, and maintained in position by a fastener 62, illustratively a threaded nut. As such, in order to move rear shaft 46, couplers 58 and fasteners 62 are loosened and/or removed to allow isolators 56 and rear shaft 46 to move.

Figure 11:
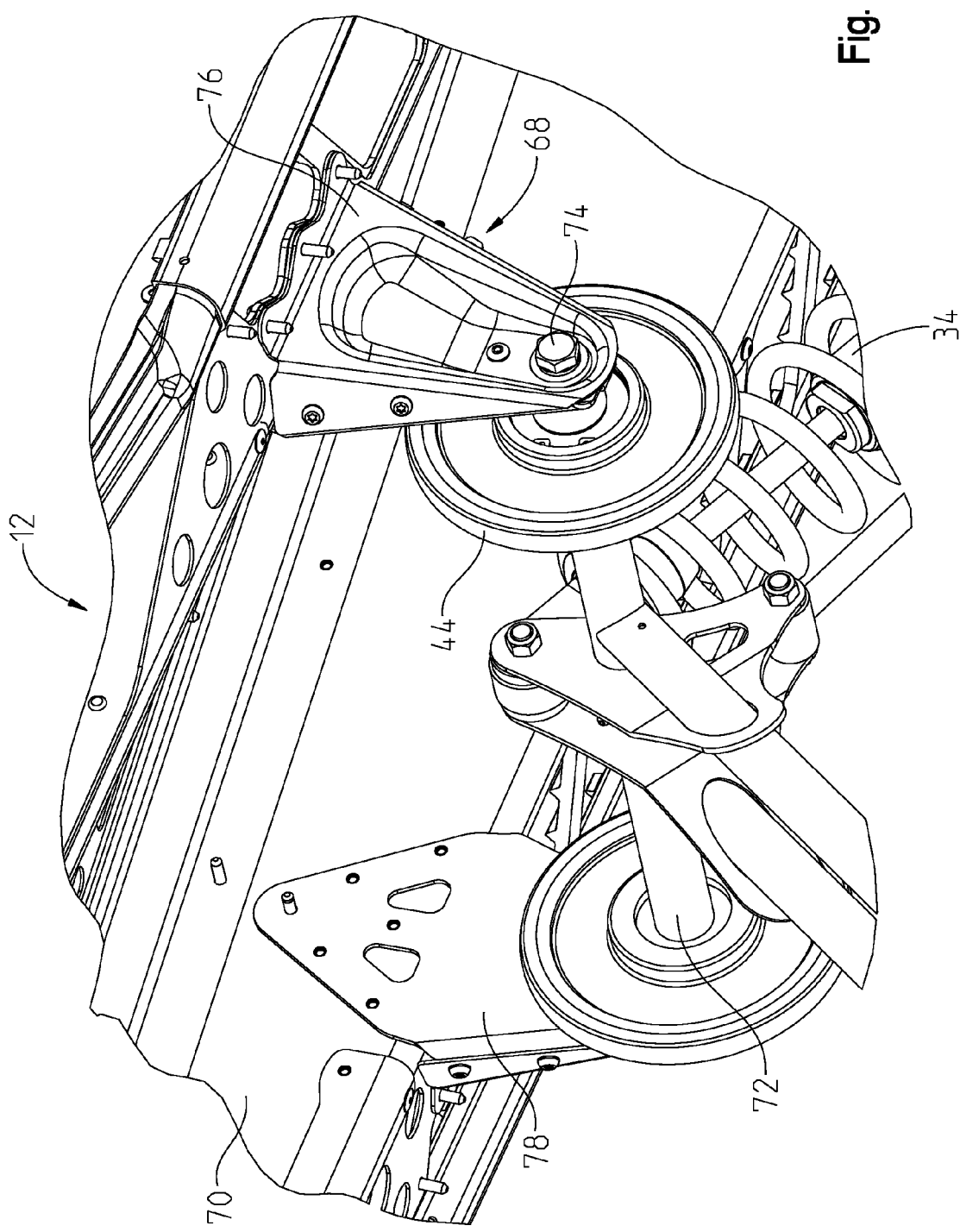
FIG. 11 is a left front perspective view of carrier wheels of the rear suspension assembly of FIG. 8 coupled to the frame.
Figure 12:
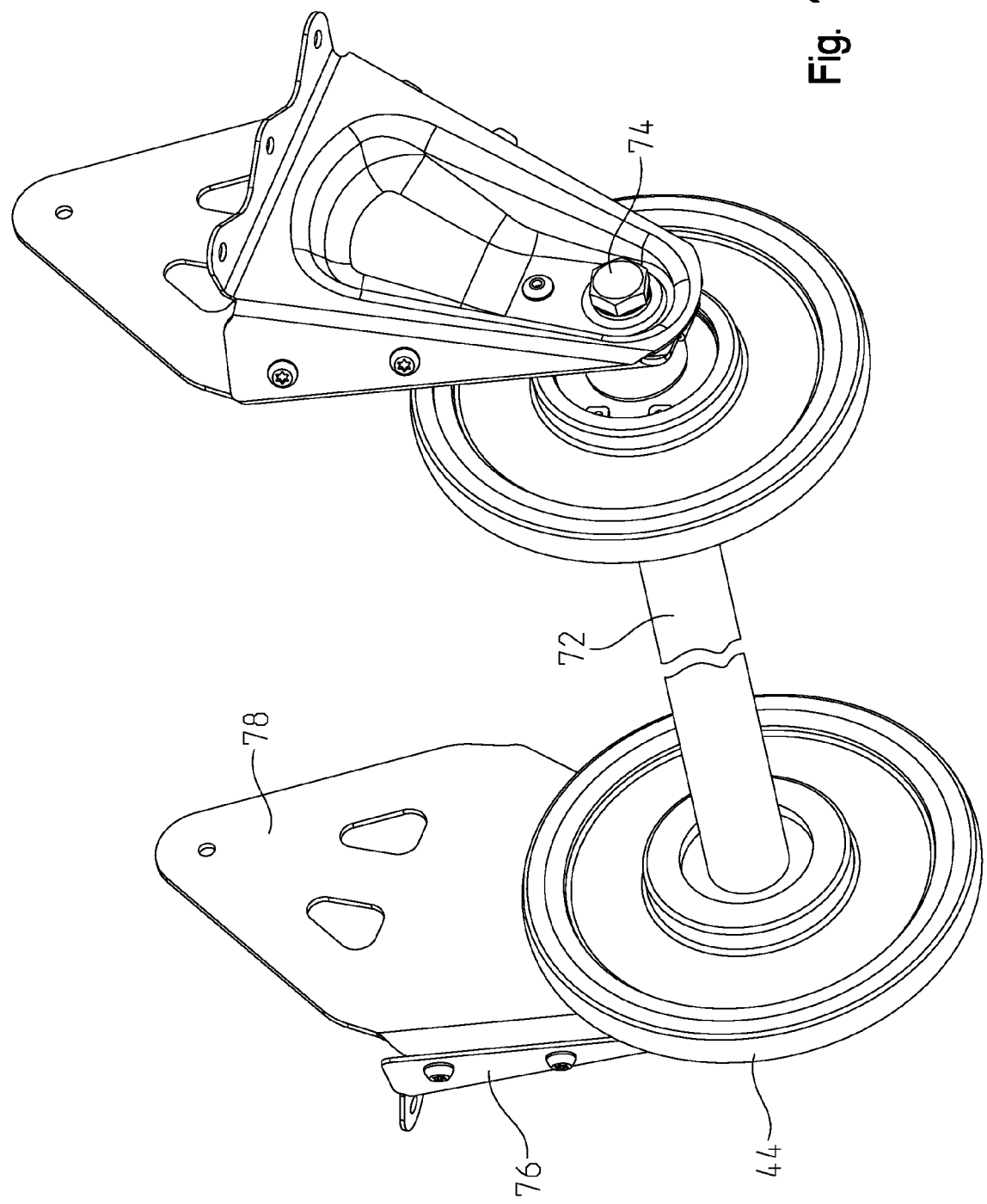
FIG. 12 is a left front perspective view of the carrier wheels of FIG. 11 coupled to suspension pads.
Figure 13:
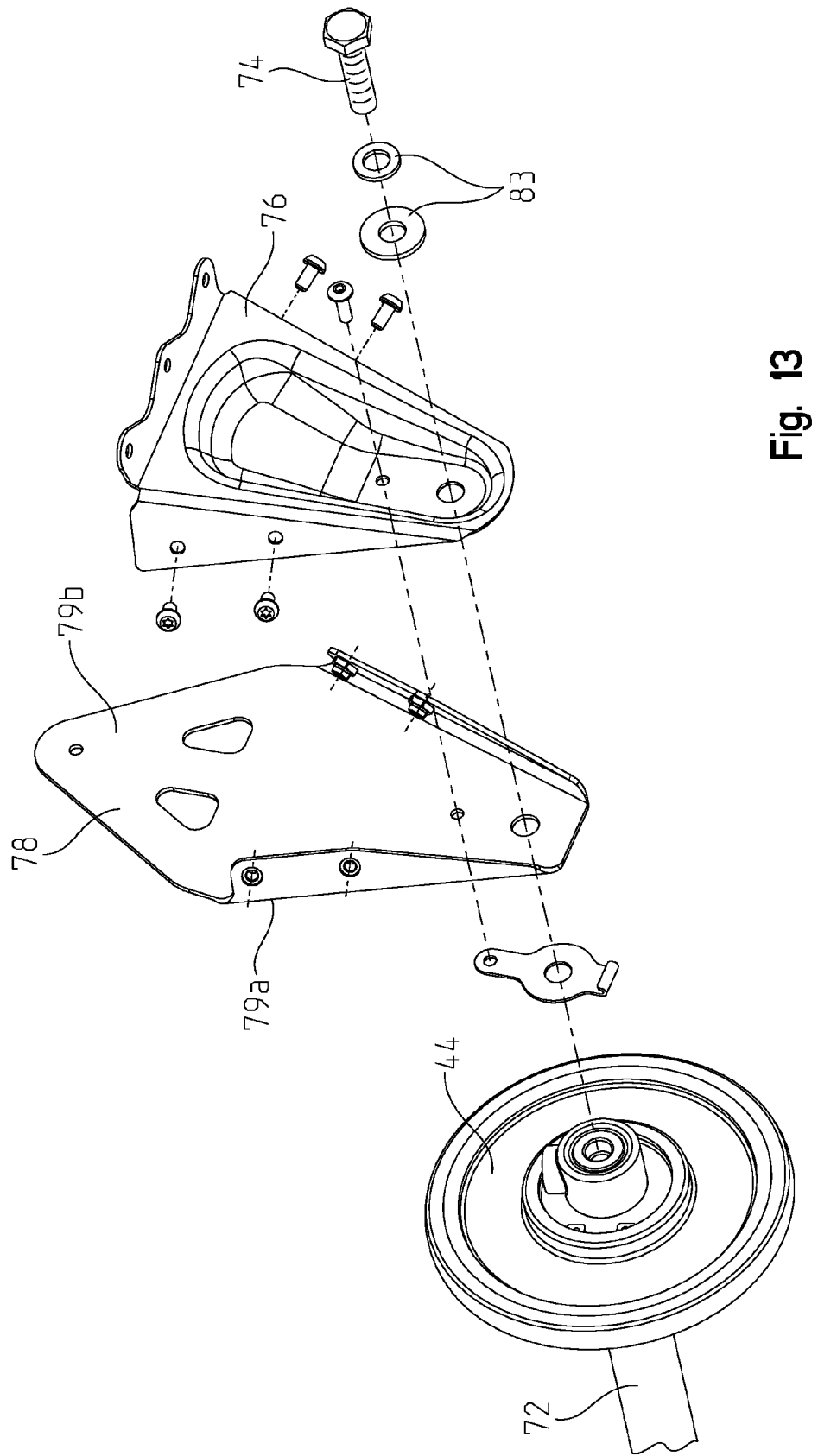
FIG. 13 is an exploded view of the suspension pad of FIG. 12.

Carrier wheels 44 also may assist in maintain the tension in endless track 18 during operation of snowmobile 10. Referring to FIGS. 11-13, each carrier wheel 44 is supported on frame 12 by a suspension pad 68. More particularly, carrier wheels 44 are supported on side walls 70 of frame 12 and suspension pads 68 extend below side walls 70 to couple with a carrier wheel shaft 72. Carrier wheel shaft 72 extends between carrier wheels 44 and is coupled to suspension pads 68 with a fastener 74. Other conventional fasteners 83, such as washers, may be used with fastener 74 to couple carrier wheel shaft 72 to suspension pads 68. In one embodiment, fasteners 83 are riveted washers. Carrier wheel shaft 72 defines the axis of rotation for carrier wheels 44.

As shown in FIGS. 12 and 13, suspension pads 68 are comprised of an outer plate 76 and an inner plate 78 coupled together with conventional fasteners (e.g., screws, bolts). In one embodiment, inner and outer plates 78, 76 are comprised of different materials. For example, outer plate 76 may be comprised of steel for lateral stiffness, and inner plate 78 may be comprised of a lightweight material, such as aluminum. Inner plate 78 may be extruded or otherwise formed through conventional process for aluminum. As such, suspension pads 68 have lateral stiffness for supporting carrier wheels 44 due to the steel outer plate 76 and are lightweight due to the aluminum inner plate 78.

By comprising inner plate 78 of aluminum, suspension pads 68 also contribute to less build up of snow and ice during operation of snowmobile 10. More particularly, as shown in FIG. 13, an inner surface 79a of inner plate 78 faces inwardly toward carrier wheels 44 and an outer surface 79b of inner plate 78 faces outer plate 76. As such, inner and outer surfaces 79a, 79b of inner plate 78 are not greatly exposed to snow and ice during operation of snowmobile 10 and, therefore, less snow and ice collect and build up on suspension pads 68.

Figure 14:
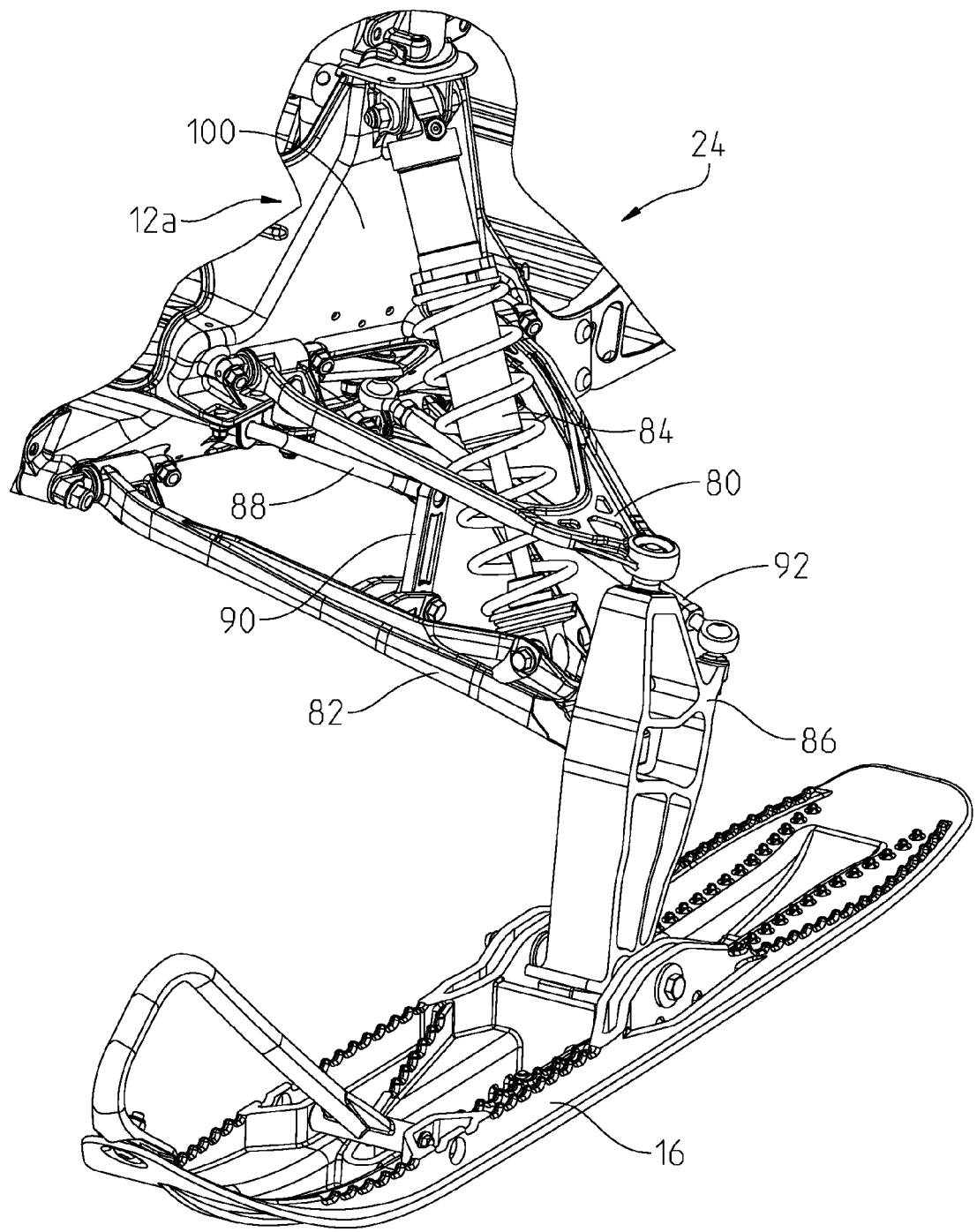
FIG. 14 is a left front perspective of a front suspension assembly of the snowmobile of FIG. 1.
Figure 15:
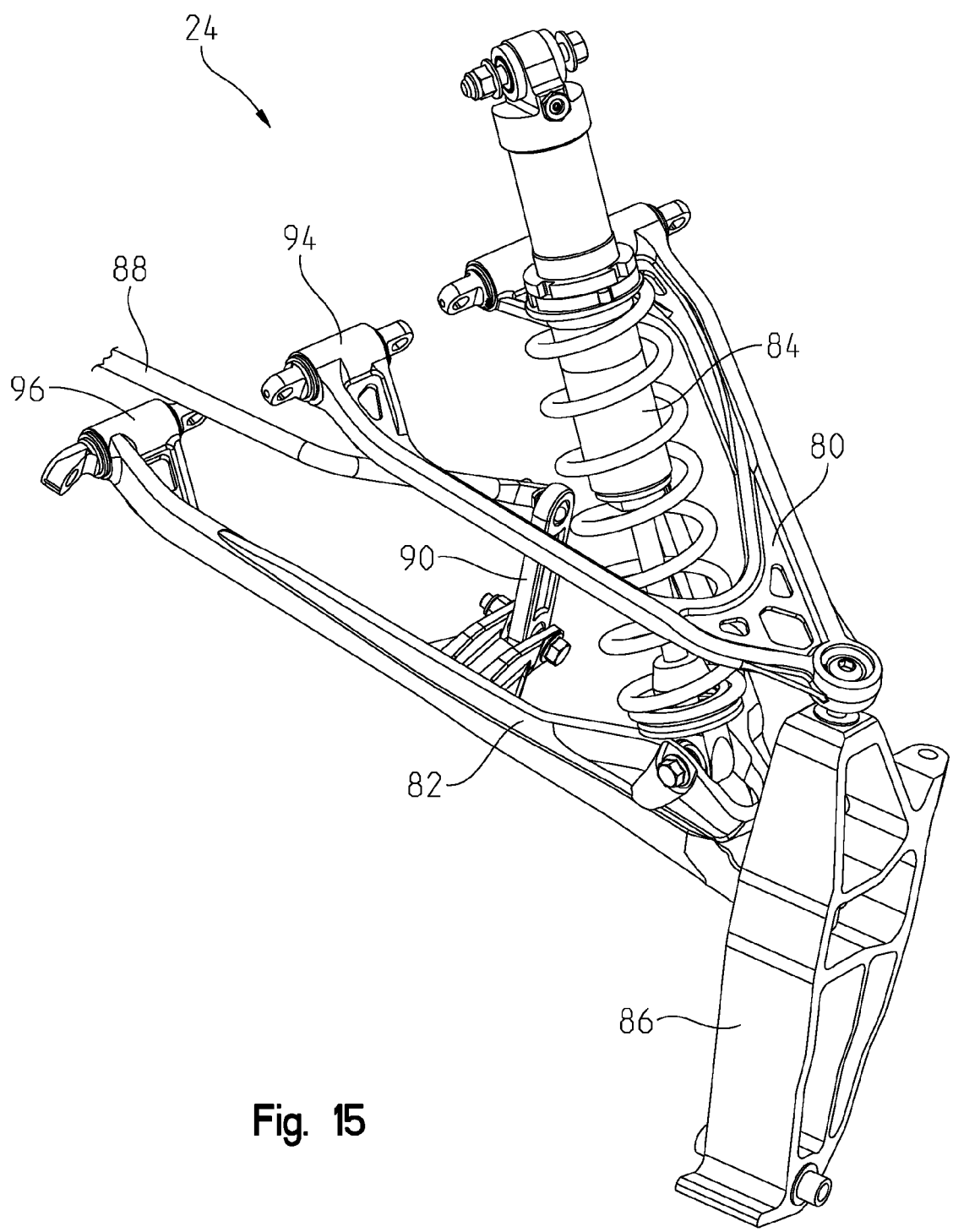
FIG. 15 is a left front perspective view of a portion of the front suspension assembly of FIG. 11.
Figure 16:
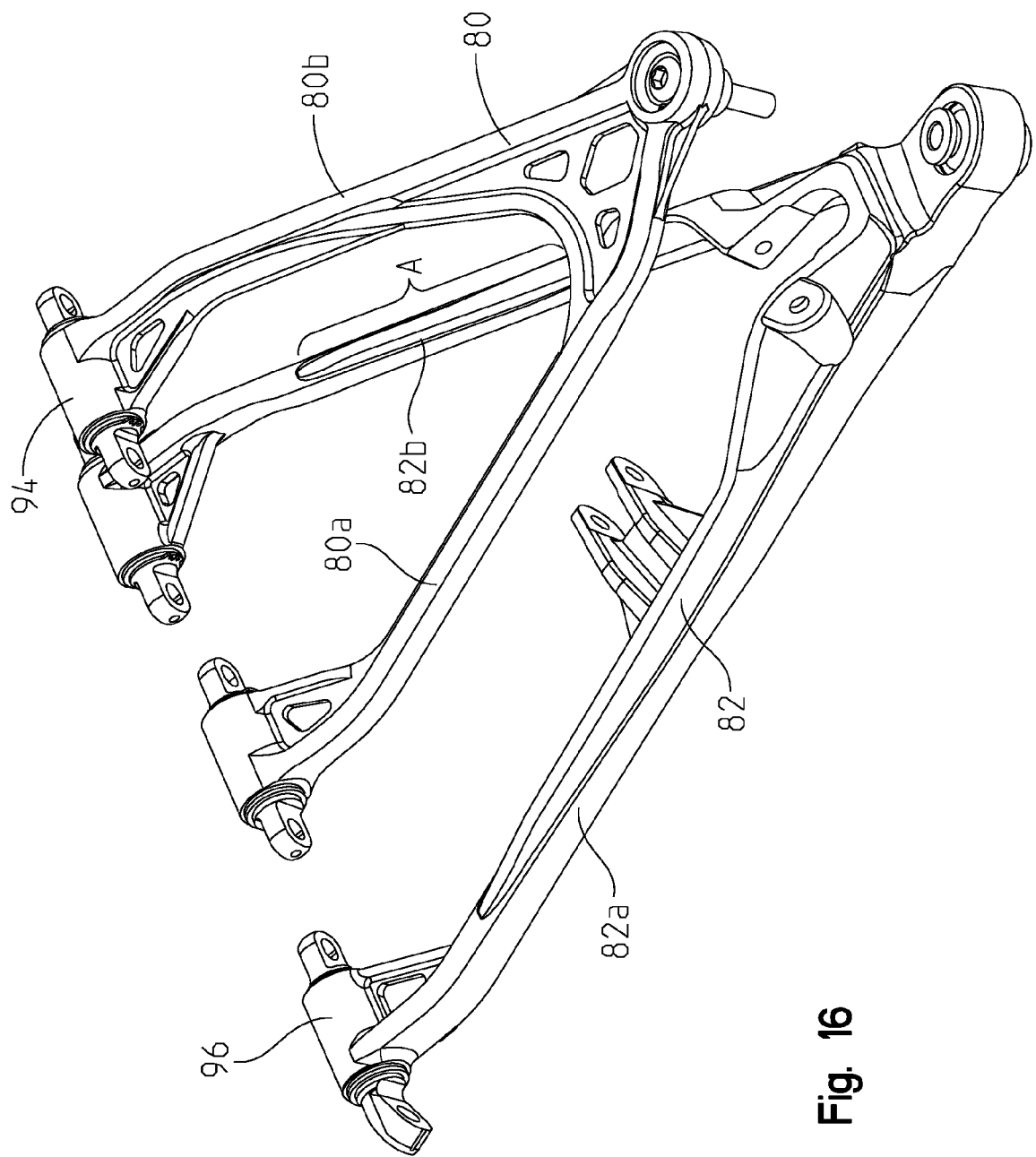
FIG. 16 is a left front perspective view of an upper control arm and a lower control arm of the front suspension assembly of FIG. 11.

Referring to FIGS. 14-18, front suspension assembly 24 is positioned longitudinally forward of rear suspension assembly 26 and includes an upper control arm 80, a lower control arm 82, a linear force element, such as shock absorber 84, a spindle 86, and a torsion bar 88. As shown in FIG. 16, upper control arm 80 includes a forward member 80a and a rearward member 80b, and lower control arm 82 includes a forward member 82a and a rearward member 82b. Front suspension assembly 24 is supported on front frame portion 12a of frame 12 and, in particular, is supported on a bulkhead 100 of frame 12.

As shown in FIG. 14, the upper end of shock absorber 84 is coupled to bulkhead 100 and the lower end of shock absorber 84 is coupled to lower control arm 82. In one embodiment, the lower end of shock absorber 84 is directly coupled to a portion of lower control arm 82 with a coupler 112 (e.g., a bolt). For example, coupler 112 may be a threaded bolt that directly couples to a corresponding threaded aperture on lower control arm 82, such that the coupling between the lower end of shock absorber 84 and lower control arm 82 does not require a nut or additional coupler threaded to coupler 112.

Additionally, torsion bar 88 is operably coupled to lower control arm 82 through a link member 90. In one embodiment, torsion bar 88 is a one-piece member that does not include any weldments or bonded portions. Upper and lower control arms 80, 82, as well as a steering arm 92, are coupled to spindle 86. More particularly, laterally outer ends of upper and lower control arms 80, 82 are operably coupled to spindle 86. Illustratively, conventional couplers, such as ball joints, couple the outer ends of upper and lower control arms 80, 82 to spindle 86.

Figure 17:
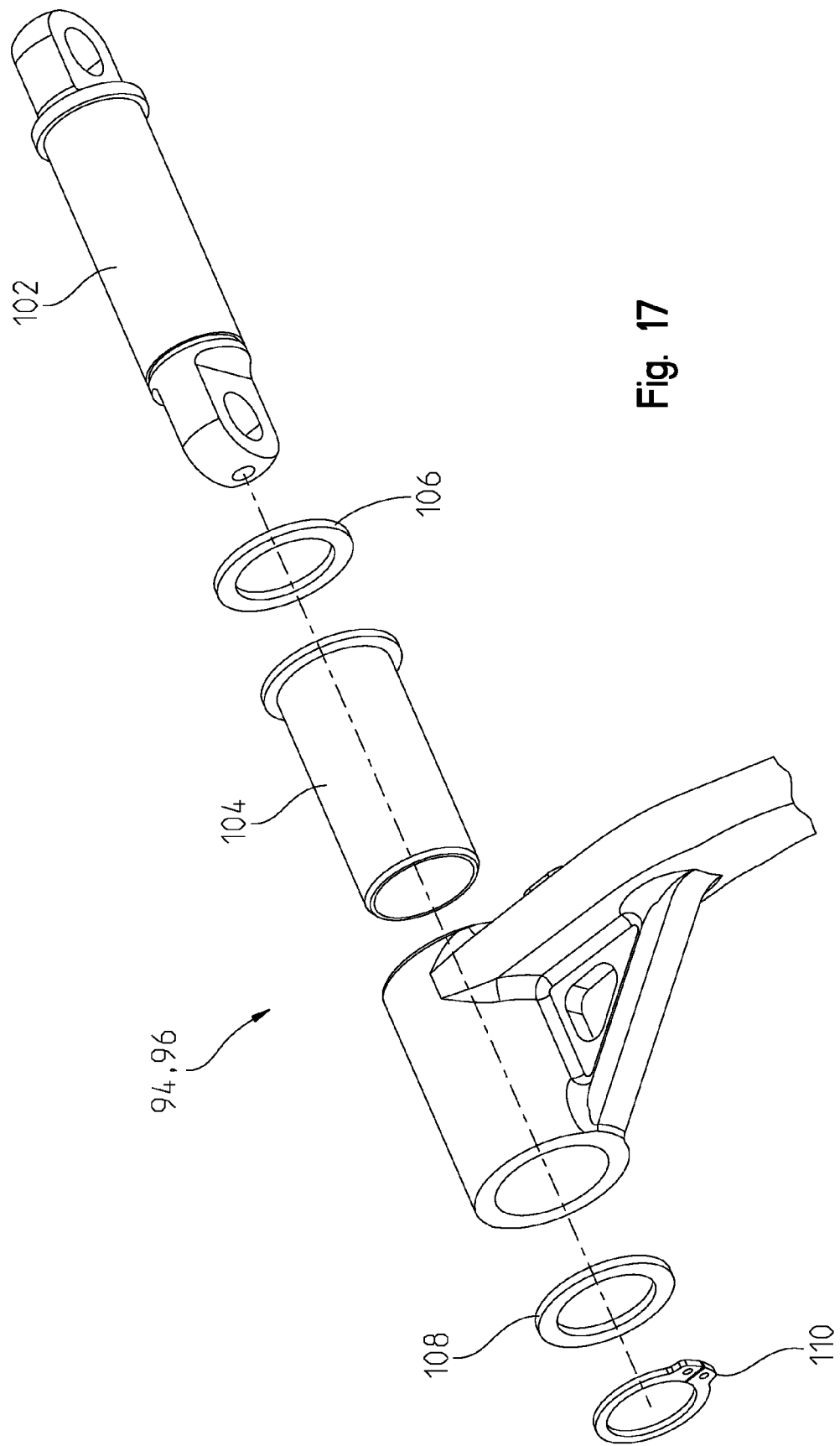
FIG. 17 is an exploded view of a bushing assembly for coupling the upper and lower control arms of FIG. 16 to the frame of the snowmobile.

As shown in FIGS. 14-17, the inner ends of upper and lower control arms 80, 82 include bushing assemblies 94, 96, respectively, for coupling with bulkhead 100. Referring to FIG. 17, each bushing assembly 94, 96 includes a pin 102, a bushing or other isolator 104, a first washer or spacer 106, a second washer or spacer 108, and a snap ring 110. Pin 102 is received within bushing 104, and both pin 102 and bushing 104 are received into the inner ends of upper and lower control arms 80, 82. First and second washers 106, 108 are positioned at opposing ends of pin 102 and bushing 104. Snap ring 110 is positioned adjacent either first or second washer 106, 108 and positively retains bushing assemblies 94, 96 within the inner ends of upper and lower control arms 80, 82. More particularly, snap ring 110 is configured to decrease the tolerance between pin 102 and the inner ends of upper and lower control arms 80, 82. Additional details of bushing assemblies 94, 96 are disclosed in U.S. patent application Ser. No. 13/763,282, filed on Feb. 8, 2013, U.S. patent application Ser. No. 14/151,983, filed on Jan. 10, 2014, U.S. patent application Ser. No. 14/152,596, filed on Jan. 10, 2014, U.S. Provisional Patent Application Ser. No. 61/513,949, filed on Aug. 1, 2011, and U.S. Provisional Patent Application Ser. No. 61/582,426, filed on Jan. 2, 2012, the complete disclosures of which are expressly incorporated by reference herein.

Referring to FIGS. 14-16, at least lower control arm 82 is formed through forging. More particularly, illustrative lower control arm 82 is comprised of forged aluminum. Alternatively, in other embodiments of front suspension assembly 24, both upper and lower control arms 80, 82 are comprised of forged aluminum. By using aluminum for upper and lower control arms 80, 82, the overall weight of snowmobile 10 may be reduced.

Additionally, by forging at least lower control arm 82, localized areas of stress may be artificially introduced into lower control arm 82 to form a predetermined yield point or failure point of lower control arm 82. More particularly, in general, lower control arms may have uniform stress throughout, however, the illustrative embodiment of lower control arm 82 has artificially-induced areas of higher stress at predetermined and desirable localized areas of lower control arm 82. For example, a middle section A of rearward member 82b (FIG. 16) may have an intentionally-induced higher stress concentration than the remaining portions of rearward member 82b, thereby predetermining that the middle section of rearward member 82b will buckle, bend, yield, or otherwise fail at that localized middle section A upon impact. In this way, there is control over the failure mode of front suspension assembly 24. In other words, the arrangement of front suspension assembly 24 and front frame portion 12a is purposely designed to limit the effects of an impact to rearward member 82b of lower control arm 82. Additionally, the intentional high-stress concentrations at the predetermined areas of lower control arm 82 (e.g., at area A) may be greater than the stress threshold of other components of snowmobile 10 such that lower control arm 82 will yield or fail before other components of snowmobile 10.

For example, during operation of snowmobile 10, if front suspension assembly 24 contacts an obstacle, the force from the impact is absorbed by portions of snowmobile 10 and certain portions may be damaged. For example, if frame 12 of snowmobile 10 absorbs the force of the impact with the obstacle, frame 12 may be damaged, which may lead to a complete loss of snowmobile 10, depending on the extent of the damage. However, by introducing predetermined failure points into lower control arm 82, lower control arm 82 may yield in response to the impact to absorb the energy of the impact before other components of snowmobile 10 are affected by the impact.

Additionally, in one embodiment, upper control arm 80 is comprised of forged aluminum and, therefore, has an increased stiffness which redirects the load from an impact into lower control arm 82, rather than frame 12. In this way, upper control arm 80 and frame 12 may be generally unaffected by an impact because lower control arm 82 yielded in response to the impact to absorb the energy of the impact. In other words, the predetermined failure mode causes failure from an impact to occur in at least lower control arm 82 of front suspension assembly 24 in order to prevent damage to frame 12.

Figure 18:
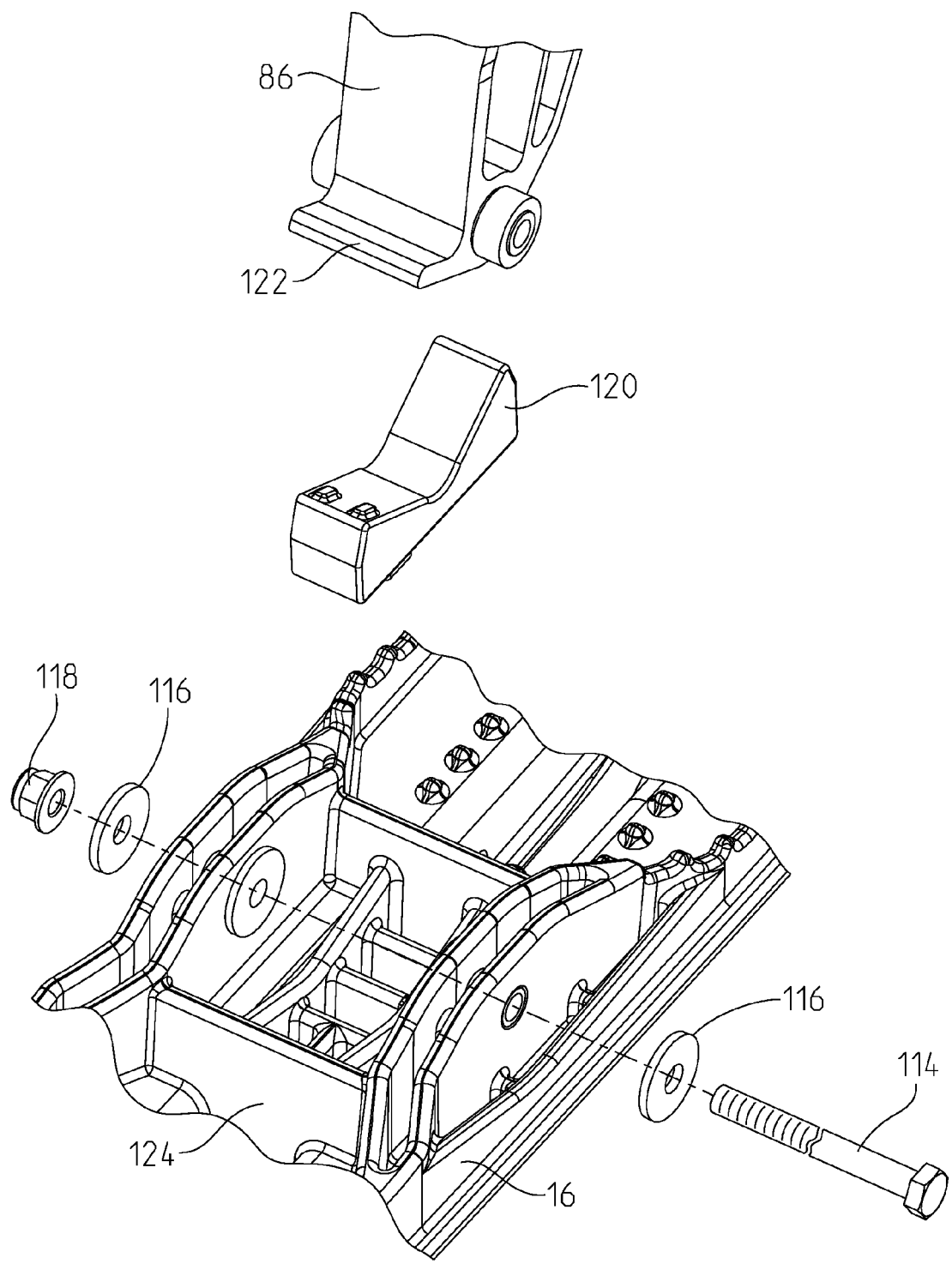
FIG. 18 is a detailed exploded view of a portion of a front ski and a front spindle of the vehicle of FIG. 1.
Figure 19:
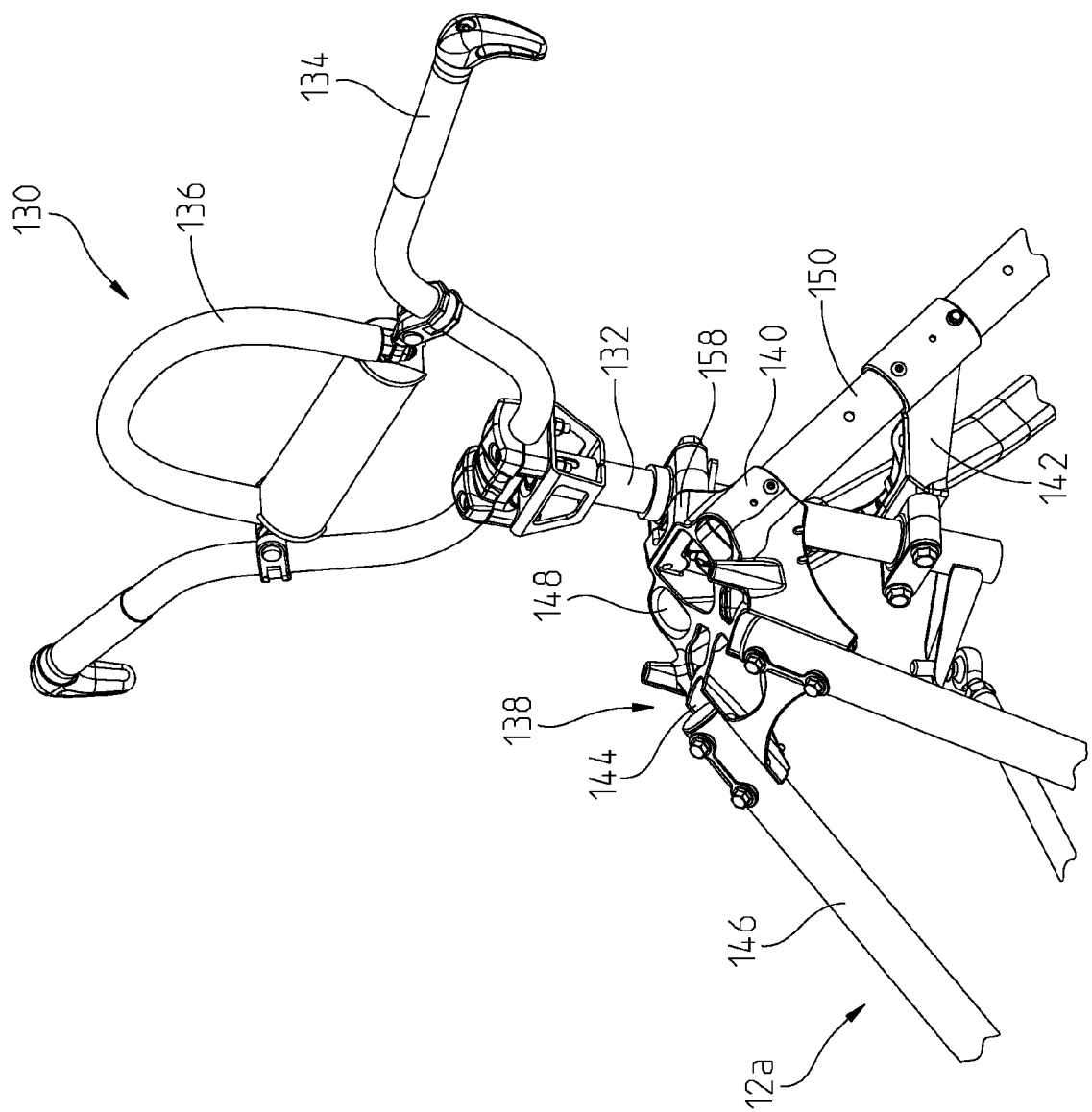
FIG. 19 is a left front perspective view of a steering assembly and a coupling member of the frame of the snowmobile of FIG. 1.

Referring to FIG. 18, a lower end of spindle 86 is coupled to ski 16. Ski 16 is able to pivot relative to spindle 86 in order to slide over various terrain during operation of snowmobile 10. More particularly, spindle 86 is pivotably coupled to ski 16 with a fastener 114, illustratively a bolt, which defines a pivot axis for ski 16. Other fasteners or couplers, such as washers 116 and nut 118, also may be coupled to fastener 114 to secure spindle 86 to ski 16. Additionally, a bracket 120 may be coupled to ski 16 and spindle 86 to facilitate pivoting of ski 16 relative to spindle 86.

Even though ski 16 is configured to pivot relative to spindle 86, ski 16 is not configured to pivot 90° relative to the ground. As such, ski 16 is not configured to "stand up" or be vertically positioned relative to the ground. In this way, the tip of ski 16 will not become vertically lodged or stuck in the snow. In order to reduce the likelihood that ski 16 will become vertically stuck in the snow, the lower end of spindle 86 includes a flange 122 which is configured to contact a rib 124 of ski 16 if ski 16 pivots in the vertical direction by a specific amount. As such, flange 122 of spindle 86 and rib 124 of ski 16 inhibit 90° rotation of ski 16 relative to spindle 86, thereby reducing the likelihood that ski 16 will become vertically stuck in the snow.

Referring to FIGS. 19-24D, steering assembly 20 is operably coupled to front suspension assembly 24 through steering arms 92 (FIG. 14). Steering assembly 20 includes steering arms 92, a steering post 132, handlebars 134, and a hoop assembly 136. Steering assembly 20 is supported at front frame portion 12a of frame 12 and, more particularly, is supported by a coupling member 138 of frame 12.

Illustratively, coupling member 138 includes an upper member 140 and a lower member 142, both of which may be cast components. Upper and lower members 140, 142 are separate components from each other and, as such, contribute to an overall weight reduction for snowmobile 10 because there is no webbing or connection extending therebetween. Additionally, by providing coupling member 138 in two separate components, the overall rigidity of coupling member 138 and steering assembly 20 may increase. Therefore, snowmobile 10 may have less flex and be more responsive to the rider.

Upper and lower members 140, 142 are both configured to support a portion of steering post 132 and portions of frame 12. Additionally, at least lower member 142 includes a tab 145 (FIG. 21) for supporting a fuel tank 143 (FIG. 25), and at least upper member 140 includes a plurality of apertures 141 which are configured as routing channels for other components of snowmobile 10, such as brake lines and/or other fluid lines. For example, by routing components, such as brake lines, through apertures 141, lateral movement of such lines and components may be removed. Additionally, the overall packaging and arrangement of the components of snowmobile 10 is more compact when components such as the brake lines are routed through apertures 141 and when large components, such as fuel tank 143, are directly coupled to coupling member 138.

Figure 20:
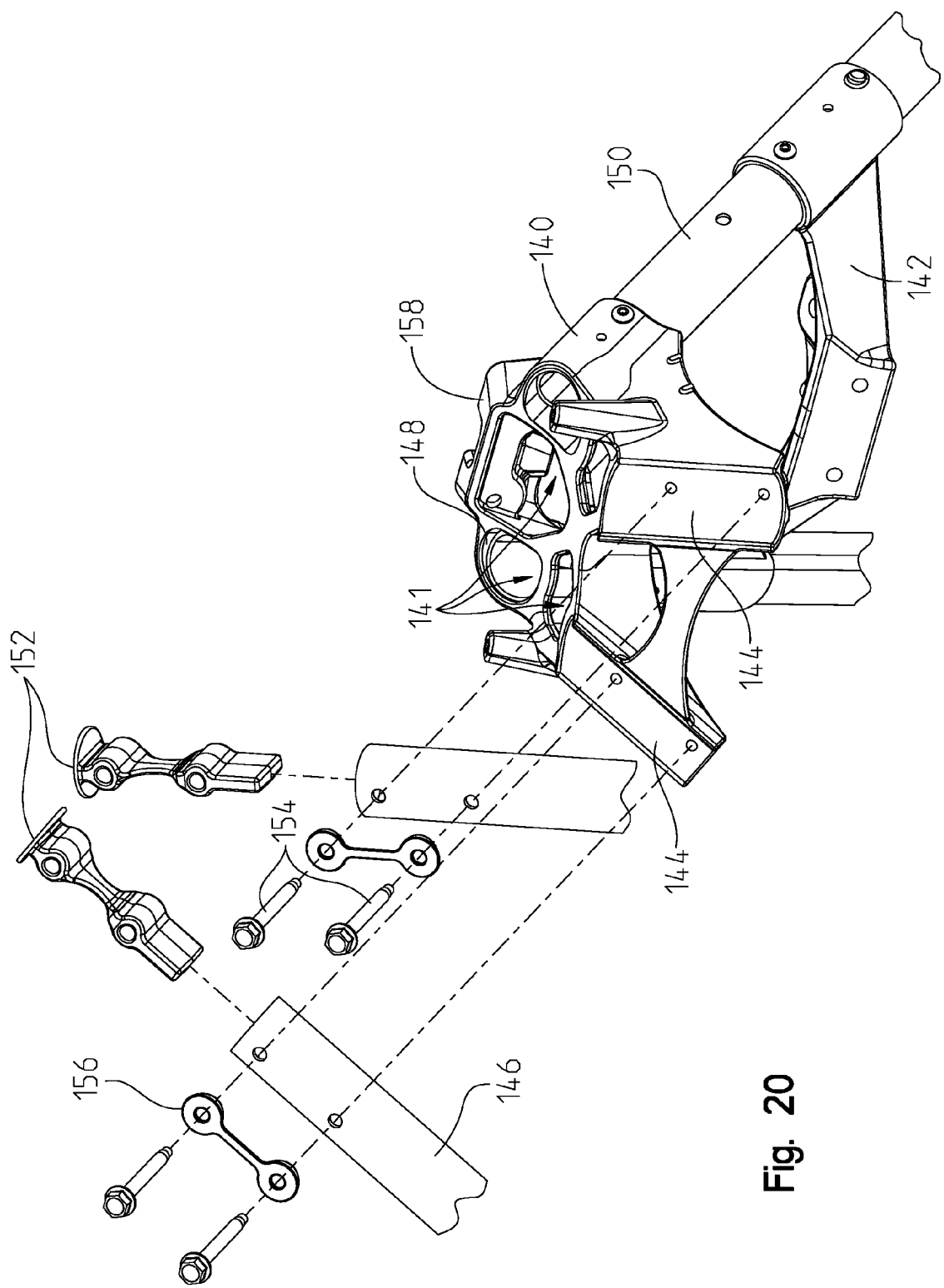
FIG. 20 is a front exploded view of the coupling member of FIG. 19 and a plurality of frame members.

In the illustrative embodiment of FIGS. 19-22, upper member 140 includes channels 144 for supporting frame members 146 of frame 12 and cylindrical openings 148 for supporting frame members 150 of frame 12. As shown in FIG. 20, the upper ends of frame members 146 include support rods 152 positioned therein to reinforce the upper ends when coupled to channels 144 of upper member 140. Support rods 152 are coupled within frame members 146 with a plurality of fasteners 154 and brackets 156. As shown, fasteners 154 extend through apertures in frame members 146, brackets 156, support rods 152, and channels 144 of upper member 140 in order to couple frame members 146 to upper member 140 of coupling member 138.

Figure 21:
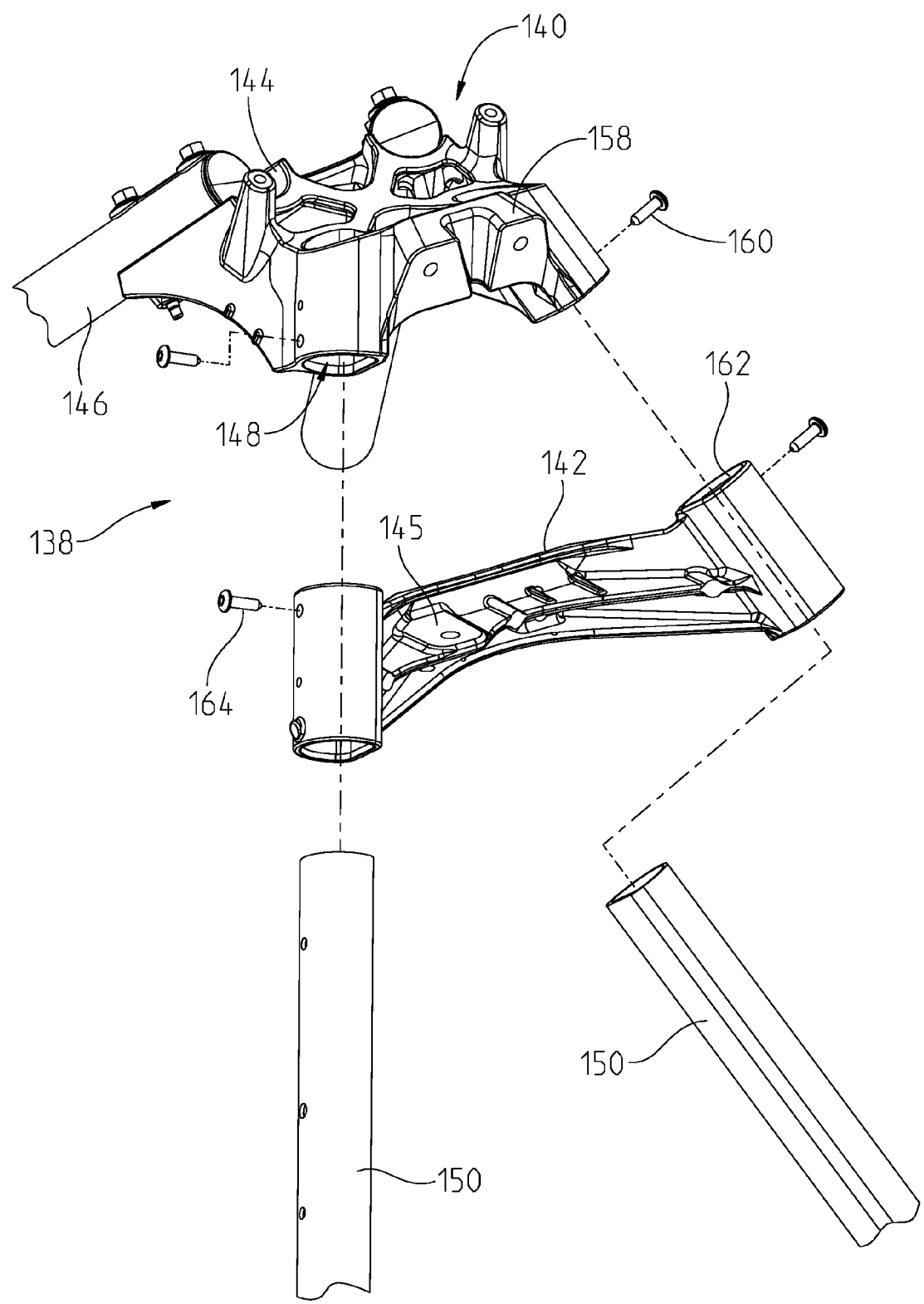
FIG. 21 is a rear exploded view of the coupling member and the frame members of FIG. 20.

Upper member 140 also supports frame members 150 of frame 12 within cylindrical openings 148. As shown in FIG. 21, the upper ends of frame members 150 are received within cylindrical openings 148 and retained therein with fasteners 160. Frame members 150 are further supported by lower member 142 of coupling member 138. More particularly, lower member 142 includes cylindrical openings 162 for receiving frame members 150. Fasteners 164 extend through apertures in lower member 142 and frame members 150 in order to retain frame members 150 on lower member 142. Illustratively, when coupled to coupling member 138, frame members 146, 150 are angled, or extend diagonally downward, from upper and lower members 140, 142.

Figure 22:
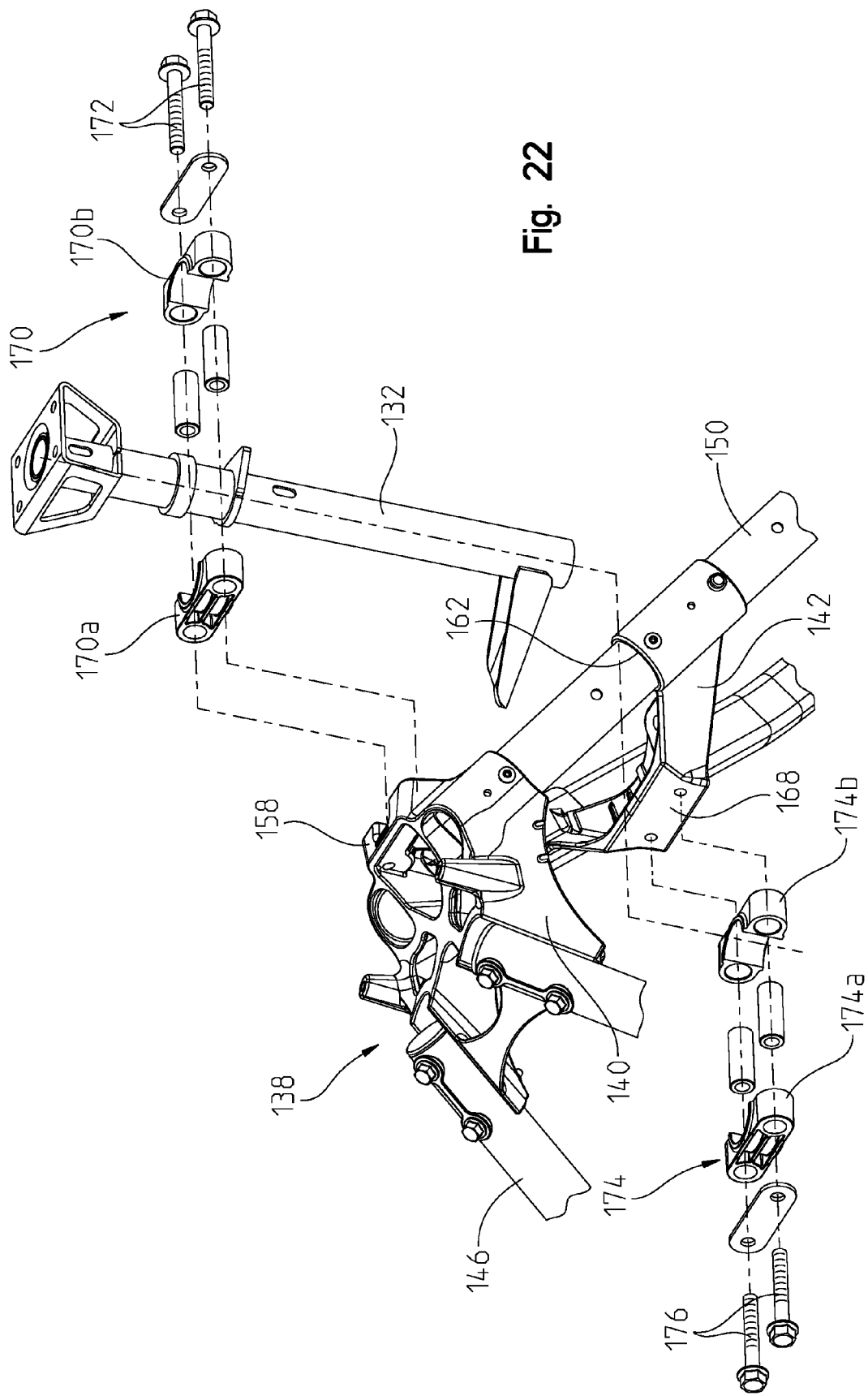
FIG. 22 is an exploded view of a portion of the steering assembly and the coupling member of FIG. 19.

Referring to FIG. 22, upper and lower members 140, 142 also include an upper web 158 and a lower web 168, respectively, for supporting steering post 132. More particularly, an upper end of steering post 132 is coupled to upper web 158 with an upper bracket assembly 170. Upper bracket assembly 170 includes a first bracket member 170a and a second bracket member 170b which are coupled to upper web 158 with fasteners 172 and generally surround a portion of steering post 132. Similarly, a lower end of steering post 132 is coupled to lower web 168 with a lower bracket assembly 174. Lower bracket assembly 174 includes a first bracket member 174a and a second bracket member 174b which are coupled to lower web 168 with fasteners 176 and generally surround a portion of steering post 132.

As shown in FIG. 22, steering post 132 is generally intermediate upper member 140 and lower member 142 of coupling member 138. In this way, steering post 132 is positioned rearward of the upper ends of frame members 146, 150, and is forward of cylindrical openings 162 of lower member 142 of coupling member 138. Additionally, because frame members 146, 150 extend diagonally downwards from upper and lower members 140, 142 of coupling member 138, the upper end of steering post 132 is positioned rearward of the upper ends of frame members 146, 150 while the lower end of steering post 132 is positioned rearward of the upper ends of frame members 146 but is generally vertically aligned with the upper ends of frame members 150. In other words, a vertical plane extending through a centerline of steering post 132 would intersect the upper ends of frame members 150 at the lower of steering post 132 but would not intersect the upper ends of frame members 146.

Figure 23A:
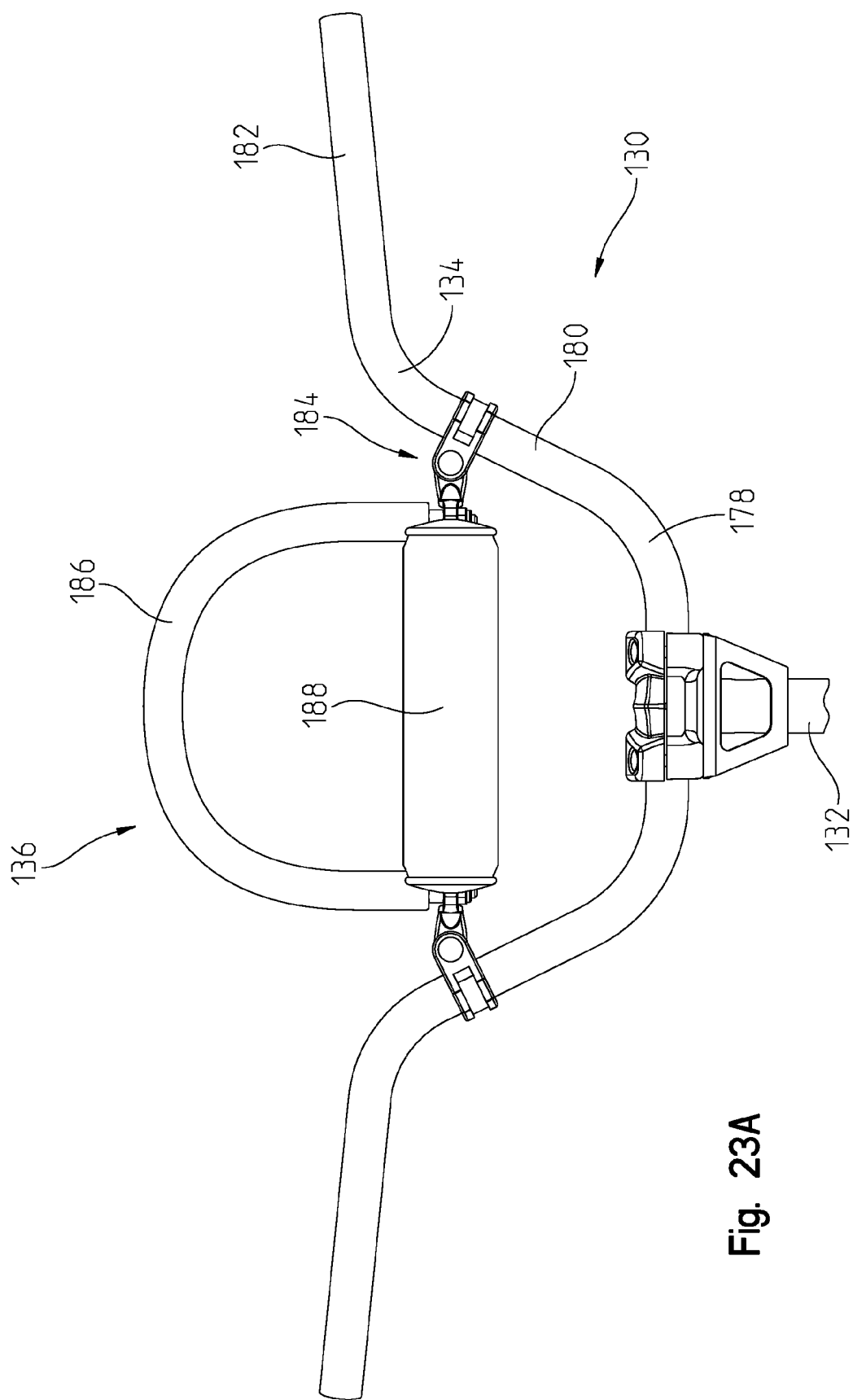
FIG. 23A is a front view of a handlebar assembly of the steering assembly of FIG. 19.
Figure 23B:
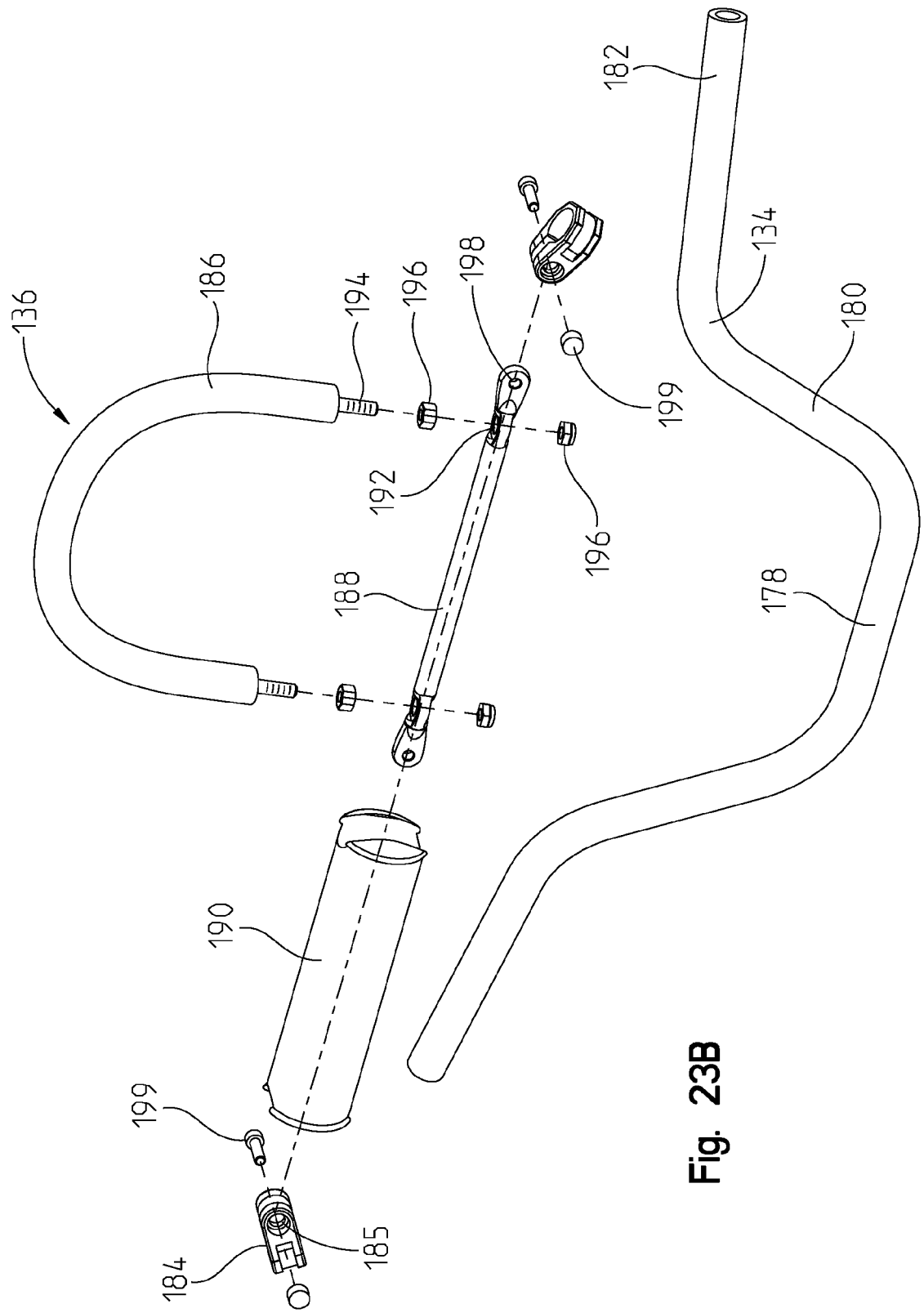
FIG. 23B is an exploded view of the handlebar assembly of FIG. 23A.
Figure 24A:
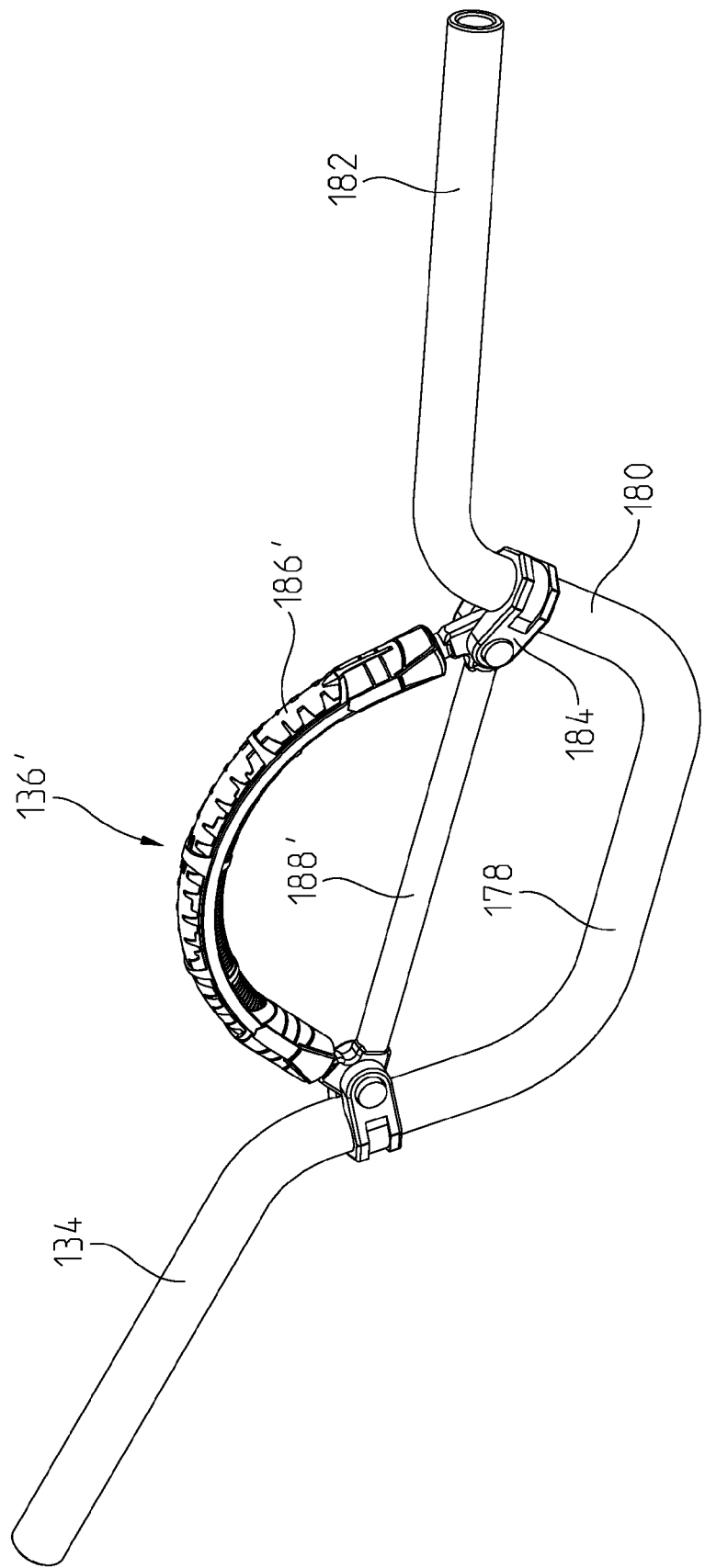
FIG. 24A is a front perspective view of an alternative embodiment of the steering assembly and illustrates handlebars and a hoop assembly.
Figure 24B:
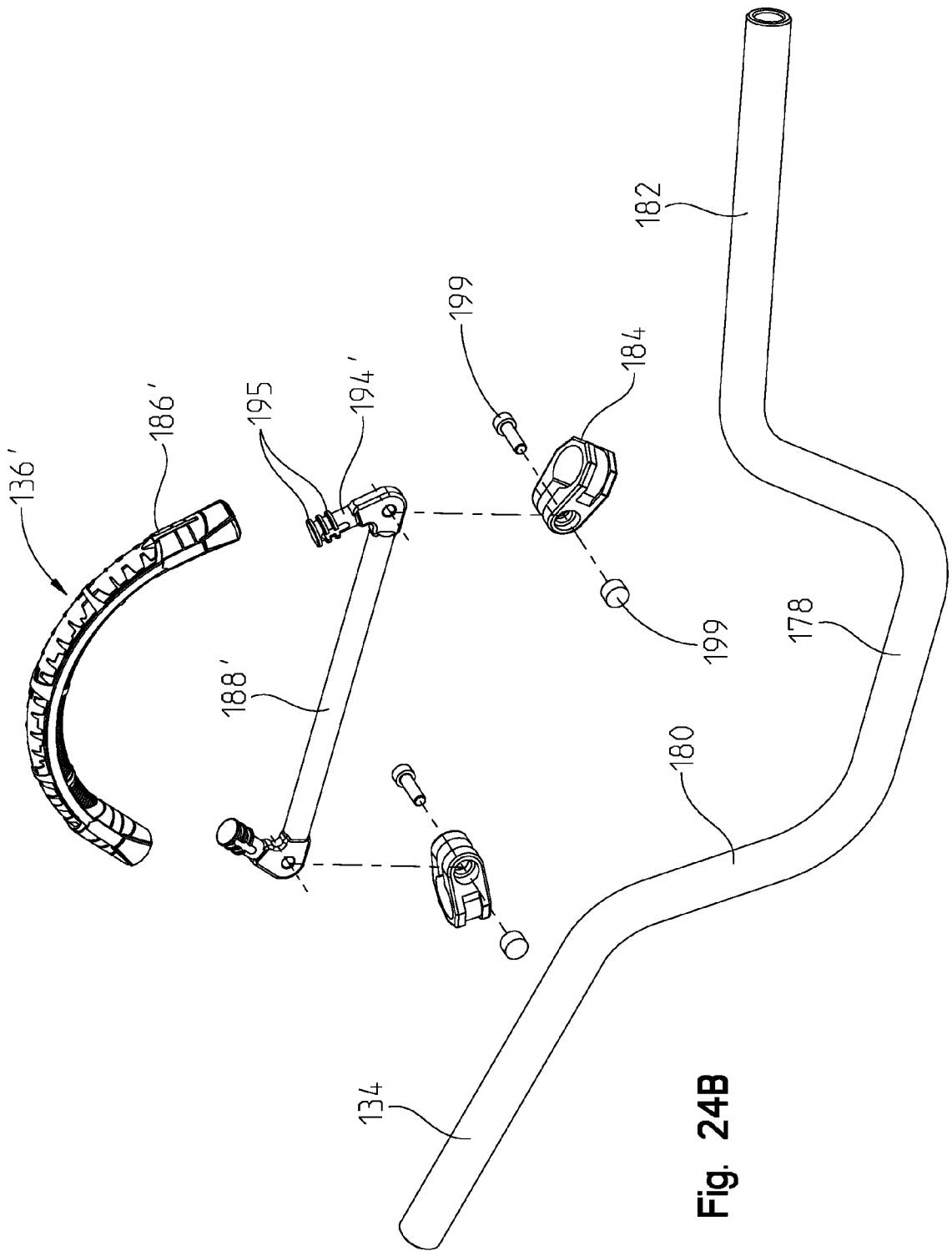
FIG. 24B is an exploded view of the handlebars and hoop assembly of FIG. 24A.
Figure 24C:
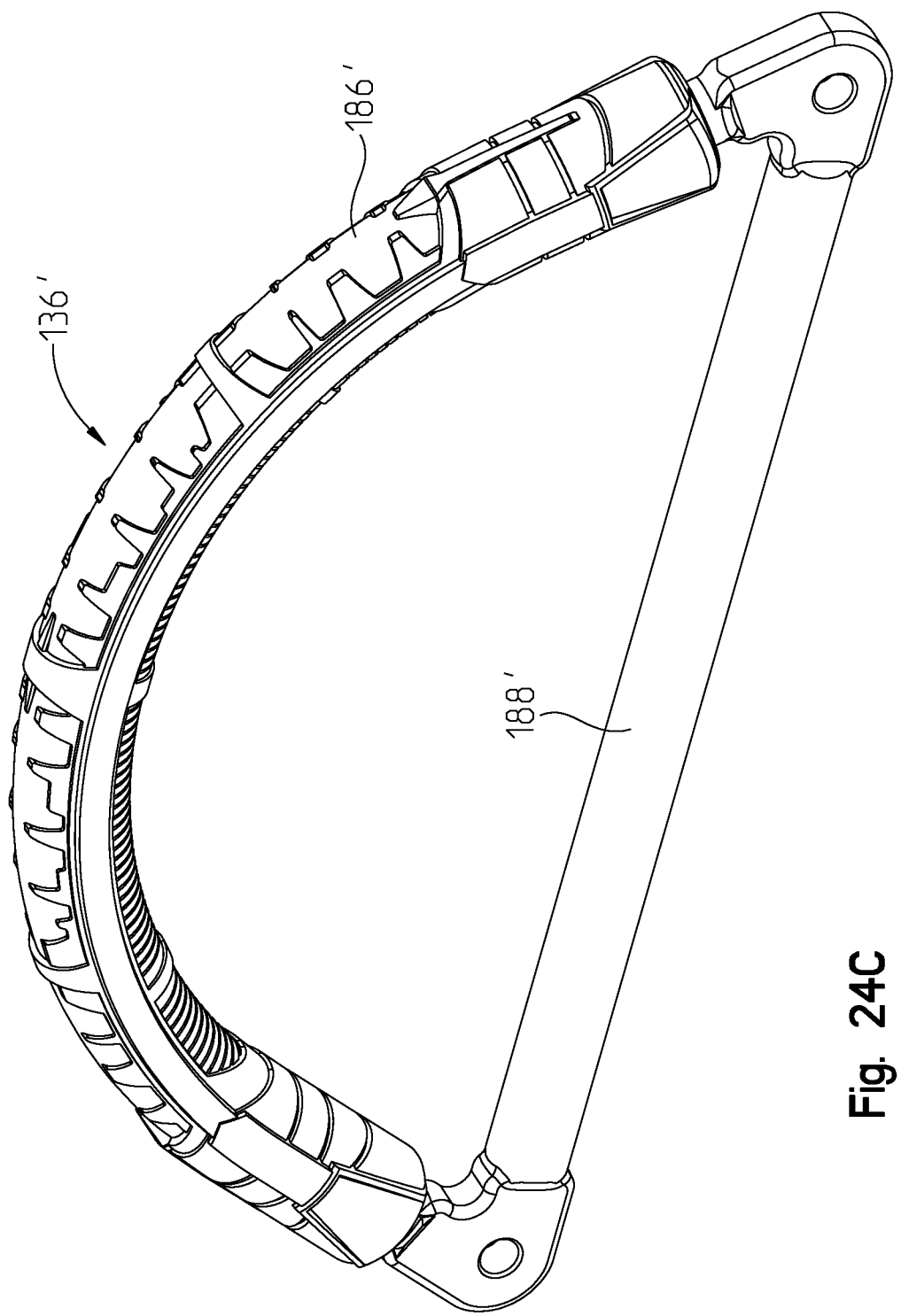
FIG. 24C is a front perspective view of the hoop assembly of FIG. 24B.
Figure 24D:
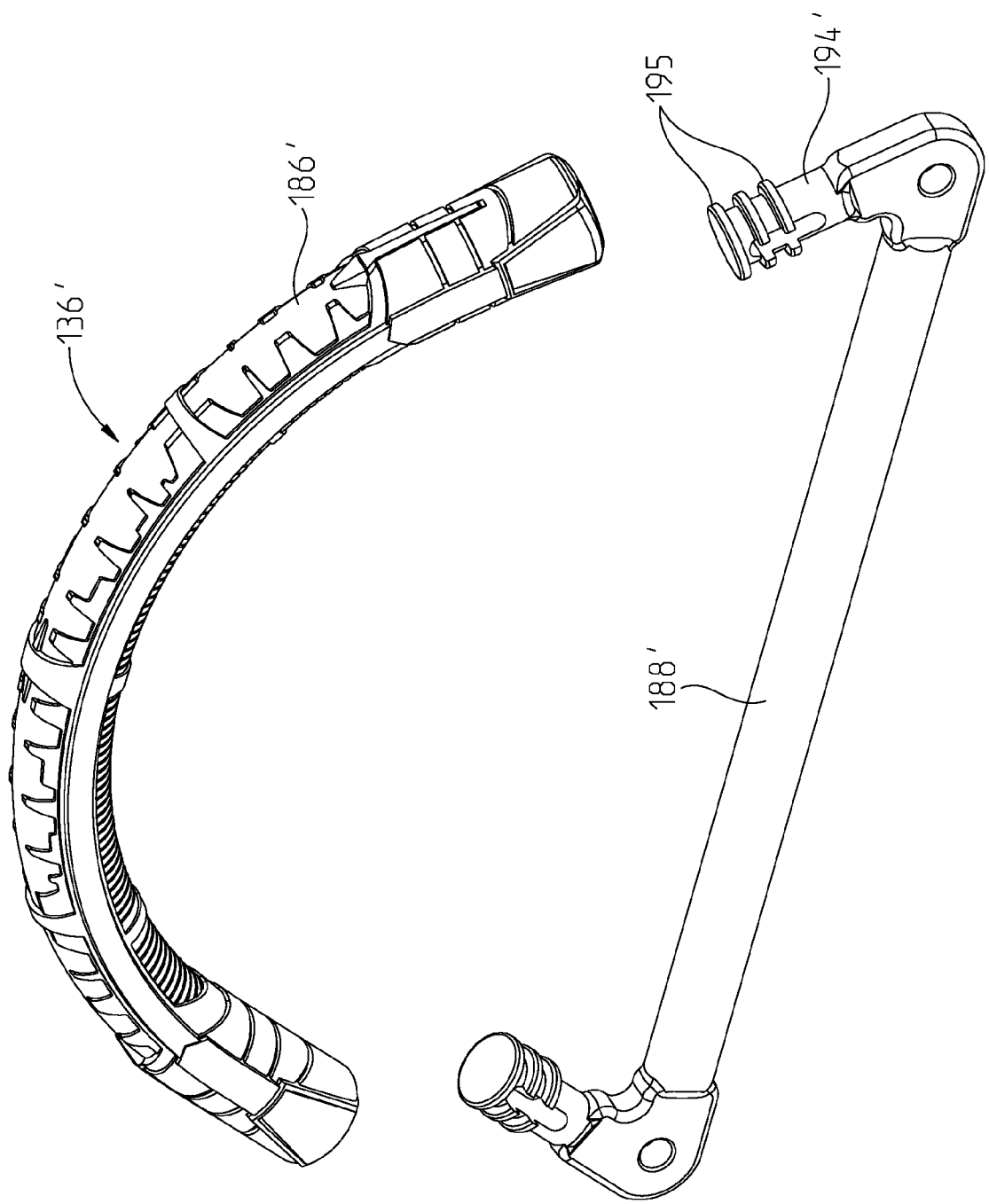
FIG. 24D is an exploded view of the hoop assembly of FIG. 24C.

Referring to FIGS. 23A and 23B, hoop assembly 136 of steering assembly 20 is coupled to handlebars 134. Handlebars 134 include a lower portion 178, a generally vertical portion 180, and a generally horizontal portion 182. As shown in FIG. 23A, steering post 132 is operably coupled to lower portion 178 of handlebars 134 such that movement of handlebars 134 rotates steering post 132 to steer snowmobile 10.

Hoop assembly 136 includes a hoop member 186 and a cross bar 188 which are coupled to generally vertical portions 180 of handlebars 134 with bracket assemblies 184. In this way, hoop assembly 136 is integrated into handlebars 134. As shown in FIGS. 23A and 23B, hoop member 186 generally defines an upside-down "U" shape and is coupled to cross bar 188. Cross bar 188 may be surrounded by a padding 190. As shown, cross bar 188 is positioned vertically intermediate lower portion 178 and horizontal portion 182 of handlebars 134, such that cross bar 188 extends horizontally between generally vertical portion 180.

In one embodiment, hoop member 186 includes pegs 194 which are received within openings 192 of cross bar 188 in order to couple cross bar 188 to hoop member 186. Fasteners 196, such as nuts, spacers, washers, or any other conventional coupler, retain hoop member 186 on cross bar 188. Additionally, in order to retain hoop assembly 136 on handlebars 134, fasteners 199 extend through openings 185 on bracket assemblies 184 and openings 198 on cross bar 188. More particularly, bracket assembly 184 generally wraps around, or surrounds a portion of, generally vertical portion 180 of handlebars 134 and is coupled to cross bar 188 with fasteners 199.

Referring to FIGS. 24A-D, an alternative embodiment hoop assembly 136' is shown. Hoop assembly 136' includes a hoop member 186' and a cross bar 188' which are coupled to generally vertical portions 180 of handlebars 134 with bracket assemblies 184. Hoop member 186' generally defines a semi-circle and may be comprised of a polymeric material, such as polyurethane).

Hoop member 186' is coupled to cross bar 188' with pegs 194'. More particularly, pegs 194' may be integrally formed with cross bar 188', and as such, both pegs 194' and cross bar 188' may be comprised of aluminum. In this way, cross bar 188' and pegs 194' define a one-piece or integral component of hoop assembly 136'. Pegs 194' include retention features, such as ridges 195, which are received within the ends of hoop member 186' and mechanically couple together hoop member 186' and cross bar 188'. Additionally, hoop member 186' is overmolded onto pegs 194', thereby defining an integral hoop assembly 136'. As such, hoop member 186' and cross bar 188' are permanently coupled together through overmolding and without fasteners to define a one-piece hoop assembly 136'.

By including hoop assemblies 136, 136' on snowmobile 10, the rider may be able to more accurately control the movement of snowmobile 10. For example, the rider is able to extend his/her hand or arm through hoop assemblies 136, 136' and hold onto hoop members 186, 186' for more effective movement of snowmobile 10, especially when side hilling. Additionally, the rider may be able to lean forward on snowmobile 10, thereby pressing his/her chest against hoop assemblies 136, 136', for more effective movement of snowmobile 10, for example when riding uphill, because padding 190 supports the rider's chest against hoop assemblies 136, 136'.

Figure 25:
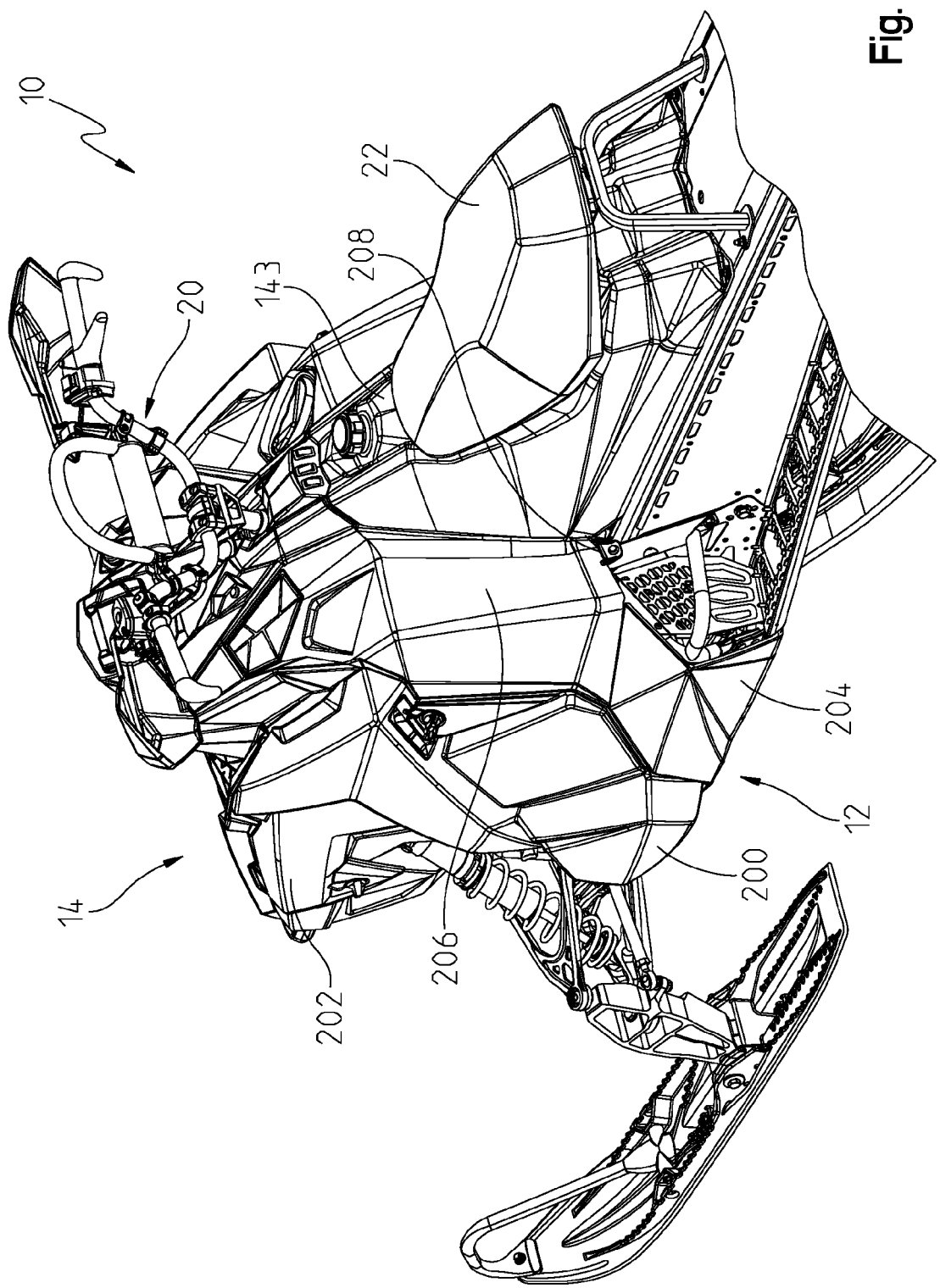
FIG. 25 is a left rear perspective view of a body assembly of the snowmobile of FIG. 1.
Figure 26:
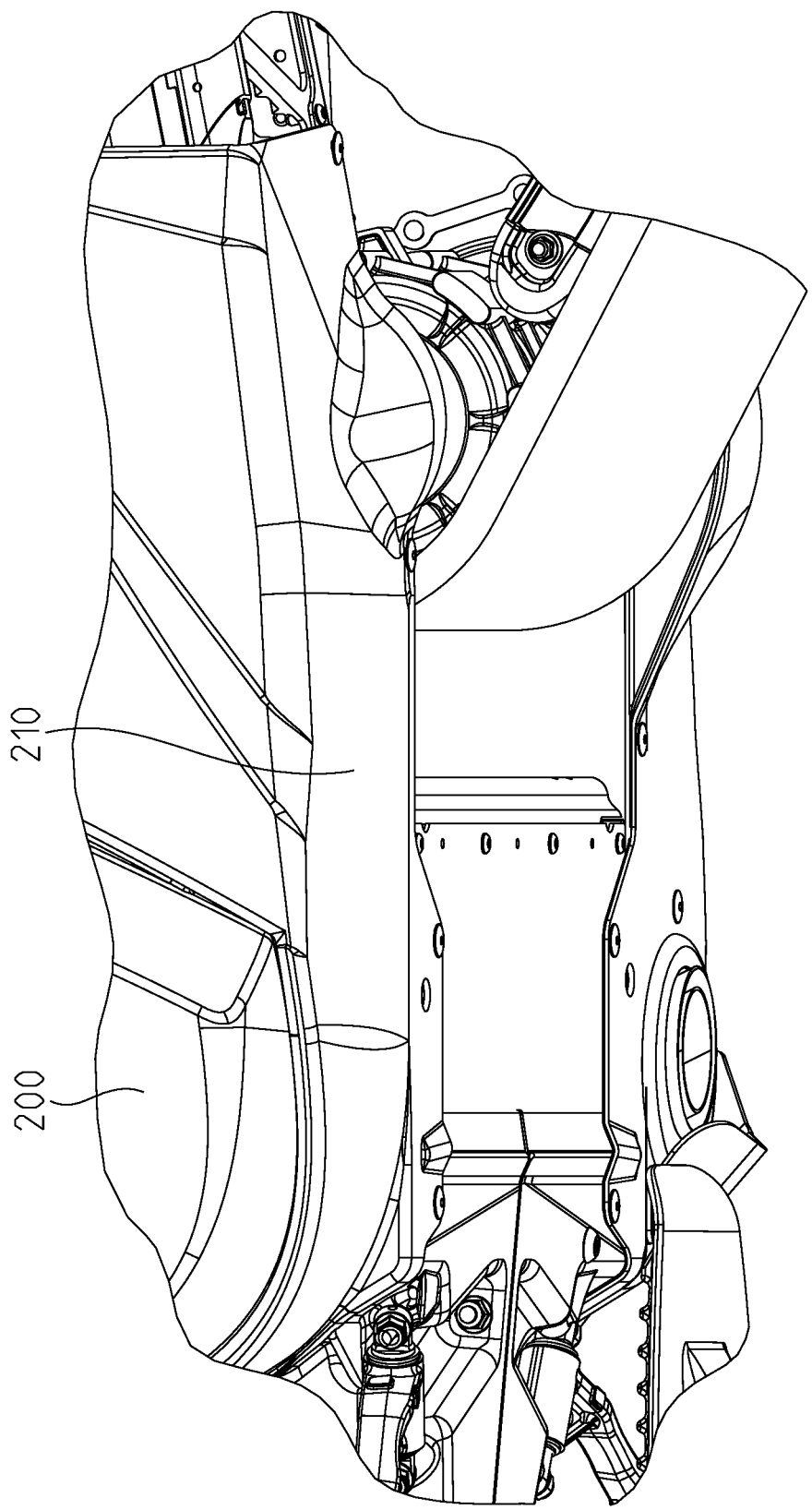
FIG. 26 is a perspective view of an underside portion of a fender of the body assembly of FIG. 25.
Figure 27:
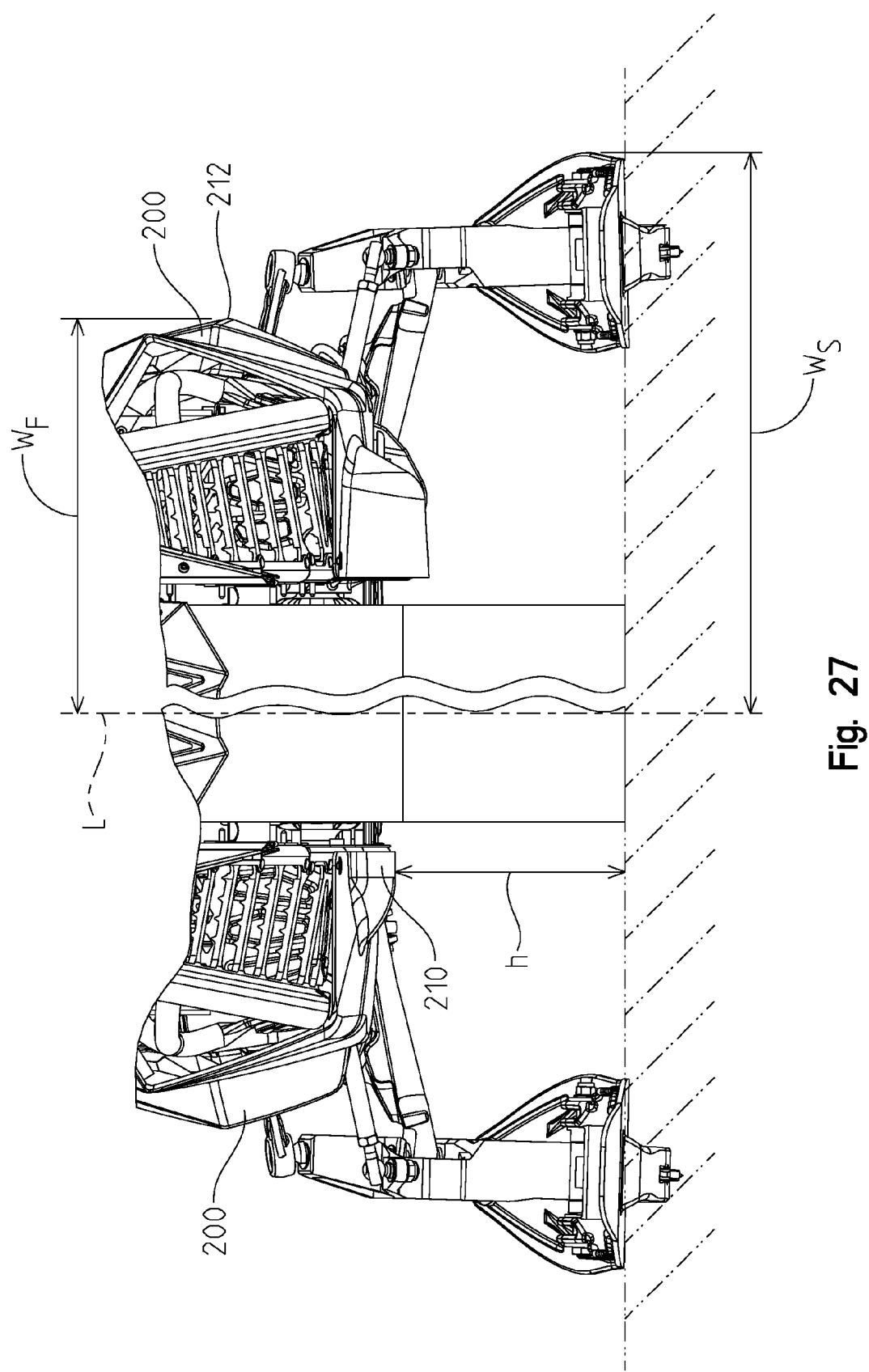
FIG. 27 is a rear view of a front end of the snowmobile of FIG. 1.

Referring to FIGS. 25-27, body assembly 14 of snowmobile 10 generally surrounds frame 12, the powertrain assembly, a portion of steering assembly 20, and other components of snowmobile 10. Body assembly 14 includes fenders 200, a hood 202, side cowlings 204, and at least one console panel 206. Console panel 206 is generally rearward of hood 202 and faces the rider. A distance between the lower end of steering post 132 and a rearward-most end 208 of console panel 206 is approximately 220 mm, thereby allowing the rider to be sufficiently near steering assembly 20 during operation of snowmobile 10. As such, the configuration of console panel 206 increases the comfort and ergonomics for the rider.

Additionally, to increase the lean angle of snowmobile 10, the width of body assembly 14 is decreased and the snow clearance of body assembly 14 is increased. For example, as shown in FIG. 27, the height (h) between the ground and the undercarriage of snowmobile 10 is approximately 230-240 mm and, illustratively, is approximately 235 mm. In one embodiment, the height of spindles 86 is increased in order to increase the snow clearance of snowmobile 10.

Referring to FIGS. 26 and 27, fenders 200 include a smooth and generally flat or horizontal bottom surface 210 which faces the ground. To increase the lean angle of snowmobile 10, the width of body assembly 14, including the width of bottom surface 210, is decreased. More particularly, body assembly 14 is positioned directly adjacent other components of snowmobile 10, such as transmission 304, in order to decrease the overall packaging of snowmobile 10, thereby decreasing the width and inhibiting snow accumulation. For example, the width $W_F$ from longitudinal axis L of snowmobile 10 to an outermost end 212 of fender 200 is approximately 450-470 mm and, illustratively, is approximately 460 mm. In other words, the width between the outermost ends 212 of fenders 200 is illustratively approximately 920 mm. However, the width Ws from longitudinal axis L to the outermost end of ski 16 is approximately 580-600 mm and, illustratively, is approximately 590 mm. In other words, the width between the outermost ends of skis 16 is illustratively approximately 1180 mm. As such, the total width of body assembly 14 is less than that total width of skis 16. Illustratively, outermost end 212 of fender 200 is positioned inwardly from the outer end of skis 16 and is positioned inwardly of spindles 86. In other words, the outer ends of skis 16 are positioned laterally outward from outermost ends 212 of fender 200. In this way, body assembly 14 does not interfere with the rider's ability to lean snowmobile 10, and the lean angle of snowmobile 10 increases.

Additionally, the ratio of the width of ski 16 relative to the width of bottom surface 210 of fender 200 is approximately 1.1, which also improves the lean angle of snowmobile 10. More particularly, the width of ski 16 is approximately 180-185 mm and, illustratively, is approximately 182 mm, while the width of bottom surface 210 of fender 200 is approximately 165-175 mm and, illustratively, is approximately 169 mm. As such, bottom surface 210 of fender 200 does not decrease the lean angle of snowmobile 10. Additionally, by decreasing the width of body assembly 14, a variety of positions for the rider may be available on snowmobile 10.

Details of a drive assembly for a track of the snowmobile are best shown in FIGS. 28-34. Drive assembly includes a drive shaft 306 and a drive sprocket assembly 320 mounted on the drive shaft 306. The drive sprocket assembly 320 is configured to drive an endless belt or track 322 as the drive sprocket assembly 320 is rotated by a drive belt 324 coupled to drive shaft 306.

The endless track 322 includes an outer surface 326 and an inner surface 328. A plurality of tread lugs 330 extend outwardly from outer surface 326. A plurality of drive lugs 332 extend inwardly from inner surface 328 of track 322. Track 322 is also formed to include a plurality of openings or windows 334.

Additional details of the drive shaft 306 and drive sprocket assembly 320 are illustrated in U.S. patent application Ser. No. 13/563,962, filed on Aug. 1, 2012, owned by the assignee of the present application, the disclosure of which is expressly incorporated by reference herein. Drive shaft 306 has a hexagonal shape and includes three outwardly extending ribs 340. Drive sprocket assembly 320 includes a pair of outer drive members 342 and a center drive member 344 located between the outer drive members 342.

Figure 31:
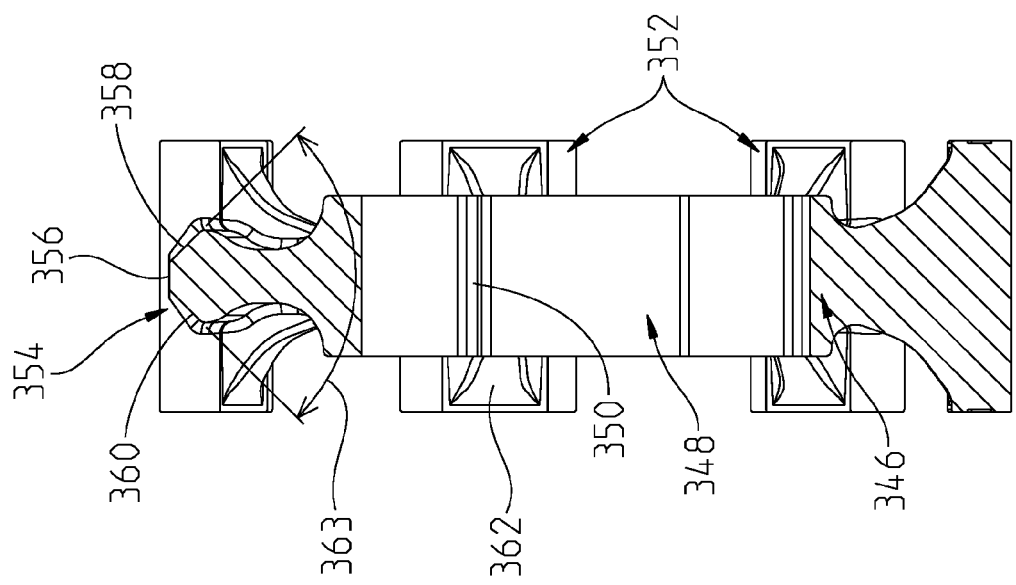
FIG. 31 is a sectional view taken through the outer drive member of FIG. 30.
Figure 30:
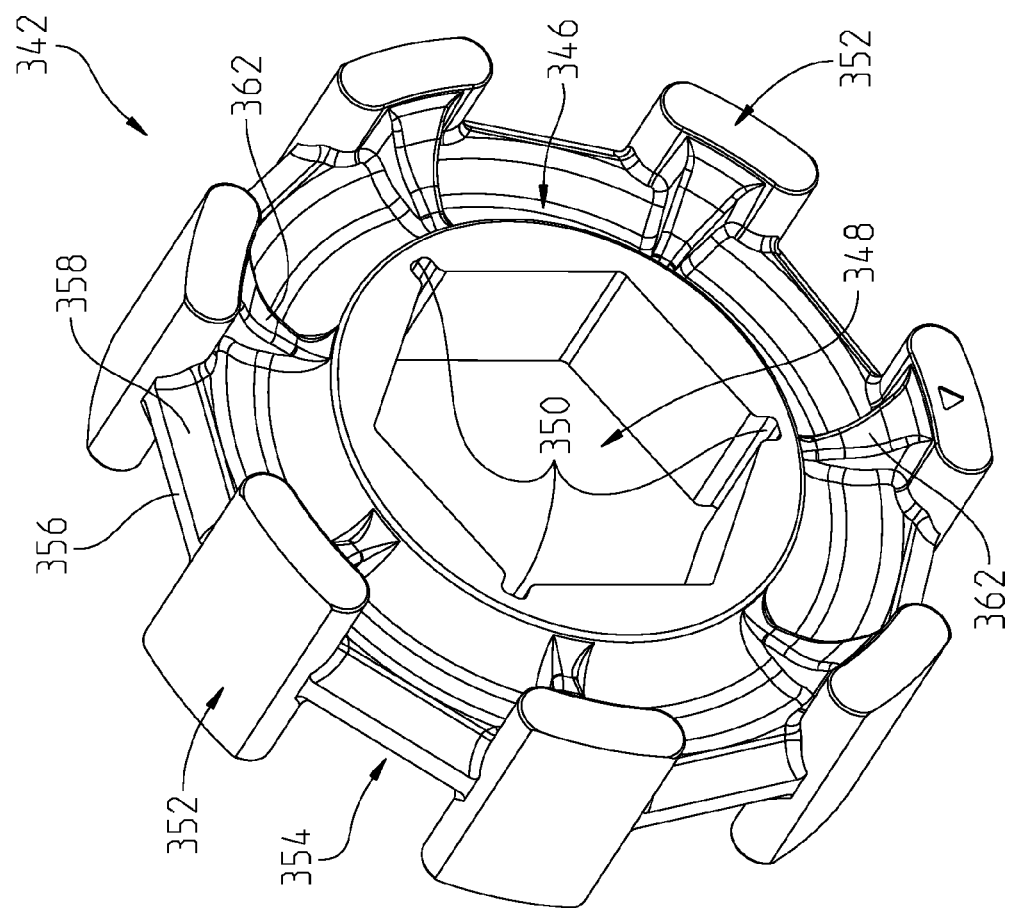
FIG. 30 is a perspective view of an outer drive member of the drive sprocket of FIGS. 28 and 29.

Outer drive members 342 are best illustrated in FIGS. 30 and 31. Outer drive members 342 include a body portion 346 having a hexagonal shaped center opening 348 and three grooves 350 aligned with ribs 340 of drive shaft 306. Outer drive members 342 also include a plurality of teeth 352 which extend generally parallel to a longitudinal axis of the drive shaft 306. A connecting web 354 extends between each of the teeth 352. In an illustrated embodiment, the connecting web 354 includes a top surface 356 and side angled surfaces 358 and 360. The angled surfaces 358 and 360 are aligned an angle of less than 180° relative to each other as illustrated by angle 363 in FIG. 31. Preferably, the angle 363 is 90° or less. It is understood that other embodiments may not include the top flat portion 356 of the web 354 so that angled side surfaces 358 and 360 meet at a point or curved surface. The angled side surfaces 358 and 360 minimize snow build up on the outer drive members compared to flat connecting web designs. Ramped surfaces 362 also extend from body portion 346 of outer drive members 342 to the teeth 352. These ramped surfaces also reduce snow build up adjacent the teeth 352.

Figure 33:
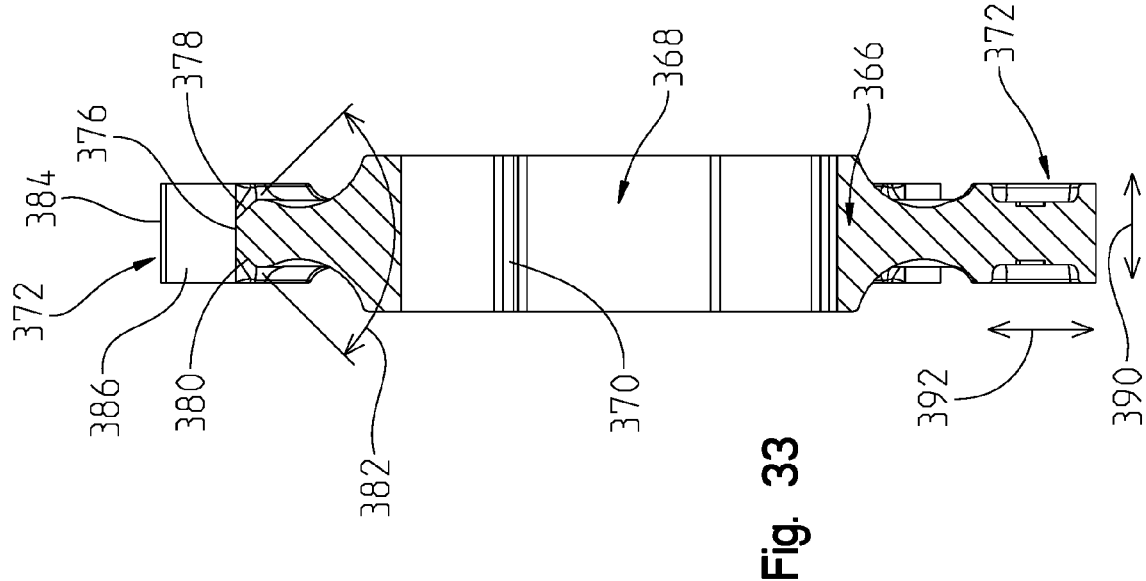
FIG. 33 is a sectional view taken through the center drive member of FIG. 32.
Figure 32:
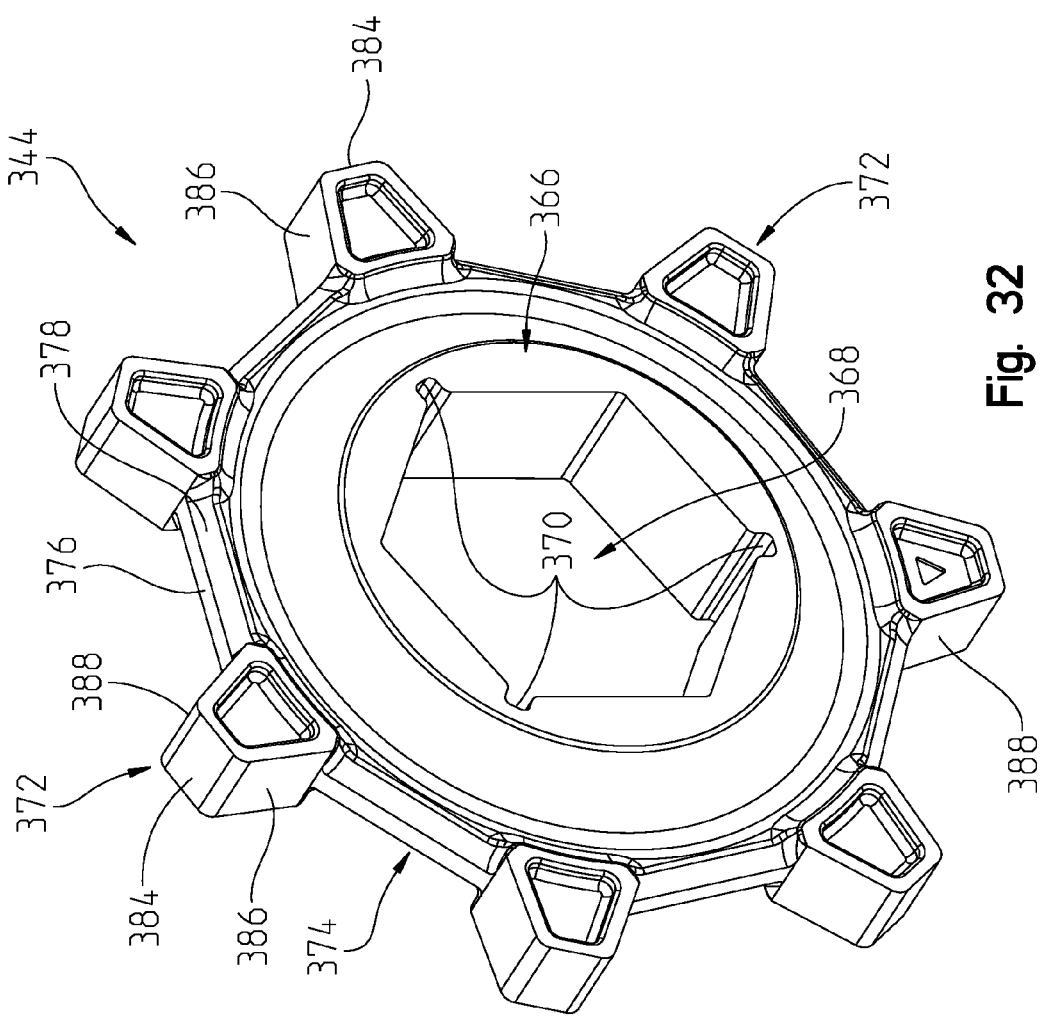
FIG. 32 is a perspective view of a center drive member of the drive sprocket of FIGS. 28 and 29.

Center drive member 344 is best illustrated in FIGS. 32 and 33. Center drive member 344 includes a body portion 366 having a hexagonal shaped center opening 368 and three grooves 370 aligned with ribs 340 of drive shaft 306. Center drive member 344 also includes a plurality of teeth 352 which extend radially outwardly from the body portion 366 generally transverse to the longitudinal axis of the drive shaft 306. A connecting web 374 extends between each of the teeth 372. In an illustrated embodiment, the connecting web 374 includes a top surface 376 and side angled surfaces 378 and 380. The angled surfaces 378 and 380 are aligned an angle of less than 180° relative to each other as illustrated by angle 382 in FIG. 33. Preferably, the angle 382 is 90° or less. It is understood that other embodiments of the web 374 may not include the top flat portion 376 so that angled side surfaces 378 and 380 meet at a point or curved surface. The angled side surfaces 378 and 380 of web 374 minimize snow build up on the center drive member 344 compared to flat connecting web designs.

The teeth 372 of center drive member 344 each include a top surface 384 and first and second angled side surfaces 386 and 388. Angled side surfaces 386 and 388 are illustratively aligned at an angle of about 35° relative to each other and are configured to engage opposite edges of the track windows 334 if the teeth 352 of outer drive members 342 begin to slip on drive lugs 332 of track 322 in a forward direction or a reverse direction. Teeth 372 include a width dimension 390 and a height dimension 392 as best shown in FIG. 33. The width dimension 390 and height dimension 392 are selected to control ratcheting of the drive sprocket assembly 320 in the track 322 during operation as discussed below.

Figure 34:
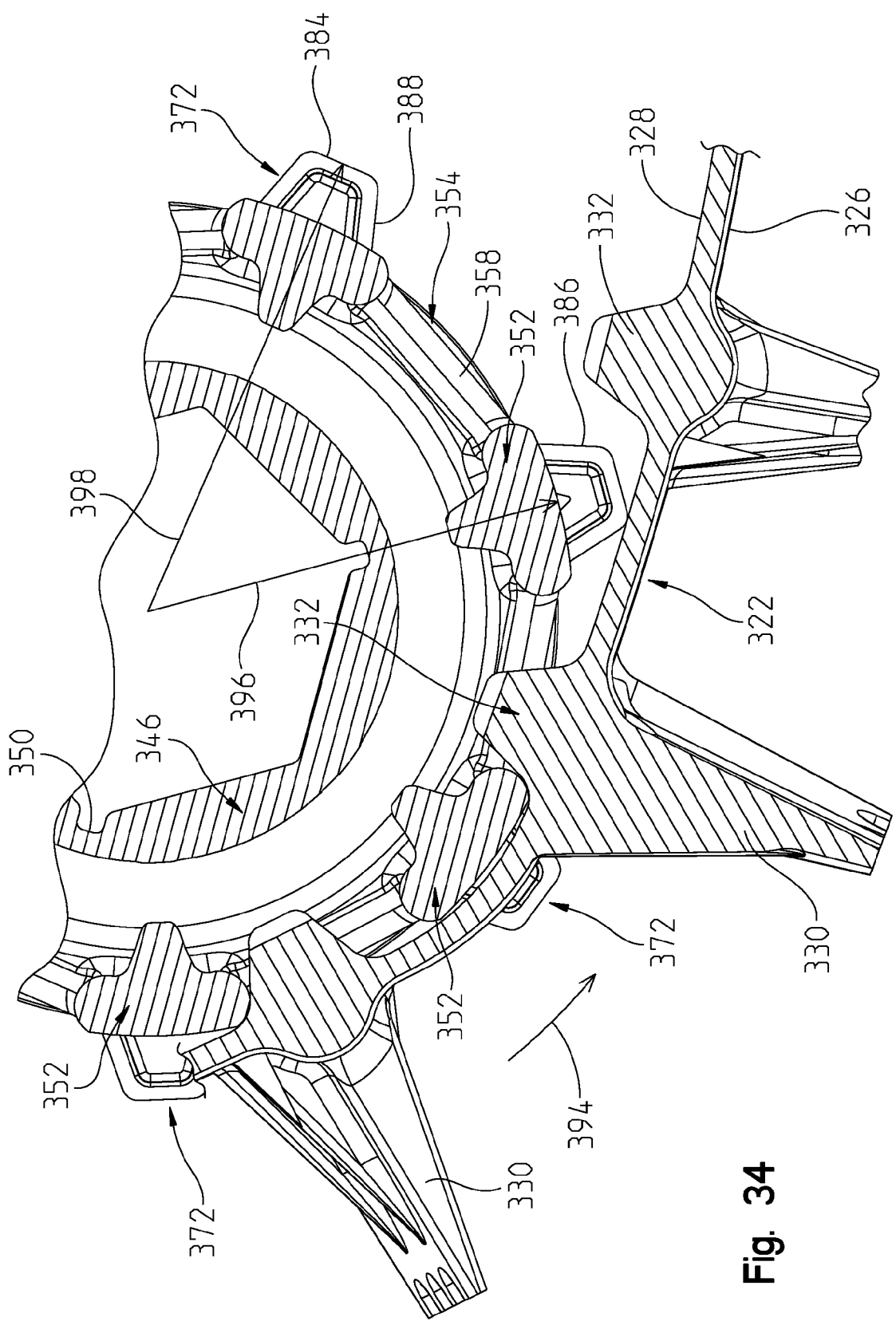
FIG. 34 is a sectional view illustrating engagement of the outer drive members of the drive sprocket with drive lugs of the track of the snowmobile and illustrating teeth of the center drive member extending through windows formed in the track.

FIG. 34 illustrates operation of the drive sprocket assembly 320 to propel the endless track 322 upon rotation of the drive shaft 306. Drive shaft is rotated to rotate drive sprocket assembly 320 in the direction of arrow 394 to move the endless track 322. The teeth 352 of outer drive members 342 engage drive lugs 332 on inner surface 328 to move the track 320. The teeth 372 of center drive member 344 enter the windows 334 of track 322. The side portions 386 and 388 of teeth 372 are configured to engage edges of track 328 defining the windows 334 if the teeth 352 of outer drive member 342 begin to slip over lugs 332 of track 322.

The radius of the outer drive members 342 taken to an outer surface of teeth 352 is illustrated by dimension 396 in FIG. 34. The radius of the center drive member 344 taken to outer surface 384 of teeth 372 is illustrated by dimension 398 in FIG. 34. In an illustrated embodiment, the radii 396 and 398 are selected to control slippage or ratcheting during operation, but to permit ratcheting of the drive sprocket 320 relative to the track 322 when an exerted force exceeds a predetermined level to reduce the likely of damage to upstream drive components. In illustrated embodiments, the radius 398 of the center drive member 344 is 15% to 23% larger than the radii 396 of the outer drive members 342 to optimize ratcheting control for the drive sprocket assembly 320.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A snowmobile, comprising:
   a plurality of ground engaging members;
   a frame supported by the ground engaging members;
   a powertrain assembly supported by the frame; and
   a front suspension assembly supported by the frame and including:
      an upper control arm operably coupled to the frame; and
      a lower control arm operably coupled to the frame and being comprised of a material which is forged, at least a portion of the lower control arm includes an artificially-induced area of localized stress comprised of and integrally formed with the material of the lower control arm, and the lower control arm is configured to yield at the area of localized stress.

2. The snowmobile of claim 1, wherein the lower control arm includes a front member and a rear member, and the area of localized stress is within the rear member.

3. The snowmobile of claim 2, wherein the area of localized stress is within a middle section of the rear member.

4. The snowmobile of claim 1, wherein the lower control arm is comprised of forged aluminum.

5. The snowmobile of claim 1, further comprising a bushing assembly operably coupled to the lower control arm and the frame, the bushing assembly including a pin, a bushing, and a snap ring.

6. The snowmobile of claim 1, wherein the front suspension assembly further includes a shock absorber, and the shock absorber is operably coupled to the lower control arm with a single fastener.

7. The snowmobile of claim 6, wherein the single fastener is a threaded bolt configured to be received within a corresponding threaded opening on the lower control arm.

8. The snowmobile of claim 1, wherein the front suspension assembly further includes a torsion bar operably coupled to the lower control arm, and the torsion bar is a one-piece component.

9. The snowmobile of claim 1, wherein the ground engaging members include at least one ski, and the front suspension assembly further includes a spindle operably coupled to the at least one ski, the spindle having a flange extending forwardly and configured to contact the at least one ski during rotation of the at least one ski.

10. The snowmobile of claim 1, wherein the artificially-induced area of localized stress of the lower control arm has a higher amount of stress, in response to a force applied to the lower control arm, than other portions of the lower control arm.

11. A snowmobile, comprising:
a plurality of ground engaging members;
a frame supported by the ground engaging members;
a powertrain assembly supported by the frame; and
a front suspension assembly supported by the frame and including:
an upper control arm operably coupled to the frame and comprised of forged aluminum; and
a lower control arm operably coupled to the frame and comprised of forged aluminum, wherein the lower control arm includes a front member and a rear member, and an area of localized stress is comprised of and integrally formed with the forged aluminum of the lower control arm, and the area of localized stress is artificially induced within the rear member.

12. The snowmobile of claim 11, wherein the area of localized stress is within a middle section of the rear member.

13. The snowmobile of claim 11, further comprising a bushing assembly operably coupled to the lower control arm and the frame, the bushing assembly including a pin, a bushing, and a snap ring.

14. The snowmobile of claim 11, wherein the front suspension assembly further includes a shock absorber, and the shock absorber is operably coupled to the lower control arm with a single fastener.

15. The snowmobile of claim 14, wherein the single fastener is a threaded bolt configured to be received within a corresponding threaded opening on the lower control arm.

16. The snowmobile of claim 11, wherein the artificially-induced area of localized stress of the rear member of the lower control arm has a higher amount of stress, in response to a force applied to the lower control arm, than other portions of the lower control arm.

17. A snowmobile, comprising:
a plurality of ground engaging members;
a steering assembly operably coupled to the ground engaging members and including a steering post, steering arms, and handlebars; and
a frame supported by the ground engaging members and including a plurality of frame members, and a coupling member having an upper member and a lower member, the lower member is separate and spaced apart from the upper member, and the upper and lower members are configured to couple with the plurality of frame members and the steering post, the upper member including a first web for supporting an upper end of the steering post and the lower member includes a second web for supporting a lower end of the steering post.

18. The snowmobile of claim 17, wherein the upper member includes a plurality of channels configured to receive front frame members and a first plurality of openings configured to receive rear frame members.

19. The snowmobile of claim 18, wherein the lower member includes a second plurality of openings configured to receive the rear frame members.

20. The snowmobile of claim 17, wherein the upper member includes a plurality of apertures for receiving at least one brake line.

21. The snowmobile of claim 20, wherein the upper member includes a plurality of channels configured to receive front frame members and a plurality of openings configured to receive rear frame members, and the brake line is positioned intermediate the front frame members and the rear frame members.

22. The snowmobile of claim 17, further comprising a fuel tank, and the second web includes a tab coupled to the fuel tank.

23. The snowmobile of claim 17, wherein the upper member includes a plurality of channels configured to receive front frame members and a first plurality of openings configured to receive rear frame members, and the lower member includes a second plurality of openings configured to receive the rear frame members, and the upper end of the steering post is positioned rearward of the first plurality of openings of the upper member and is positioned forward of the second plurality of openings of the lower member when the steering post is coupled to the first and second webs.

24. The snowmobile of claim 17, wherein the steering assembly further includes a hoop assembly, and the handlebars include a lower portion, a generally vertical portion, and a generally horizontal upper portion, and the hoop assembly is coupled to the generally vertical portion of the handlebars.

25. The snowmobile of claim 24, wherein the hoop assembly includes a cross bar and a U-shaped member, the U-shaped member having pegs received within openings in the cross bar.

26. The snowmobile of claim 25, wherein the U-shaped member is overmolded with the pegs to define a one-piece component.

* * * * *